United States Patent [19]

Naber et al.

[11] Patent Number: 6,003,307

[45] Date of Patent: Dec. 21, 1999

[54] OBD CALORIMETRIC SENSOR SYSTEM WITH OFFSET ERROR CORRECTION

[75] Inventors: Jeffrey Donald Naber, Dearborn, Mich.; Patrick Wayne Blosser, East Windsor; Edward N. Balko, Middletown, both of N.J.; David Richard Price, Ann Arbor, Mich.

[73] Assignees: Engelhard Corporation, Iselin, N.J.; Motorola, Inc., Schaumburg, Ill.

[21] Appl. No.: 09/019,085

[22] Filed: Feb. 6, 1998

[51] Int. Cl.[6] .................................................... F01N 3/00
[52] U.S. Cl. ................... 60/274; 60/276; 60/277; 60/285
[58] Field of Search ............................. 60/274, 276, 277, 60/285, 278, 286

[56] References Cited

U.S. PATENT DOCUMENTS

| | | |
|---|---|---|
| 5,282,383 | 2/1994 | Kayanuma . |
| 5,289,678 | 3/1994 | Grutter ...................................... 60/277 |
| 5,317,868 | 6/1994 | Blischke et al. ........................... 60/274 |
| 5,319,921 | 6/1994 | Gopp ......................................... 60/274 |
| 5,357,750 | 10/1994 | Ito et al. . |
| 5,444,974 | 8/1995 | Beck et al. . |
| 5,451,371 | 9/1995 | Zanini-Fisher et al. . |
| 5,505,837 | 4/1996 | Friese et al. . |
| 5,636,514 | 6/1997 | Seki . |
| 5,697,214 | 12/1997 | Carnevale et al. . |
| 5,707,148 | 1/1998 | Visser et al. ............................... 374/31 |

OTHER PUBLICATIONS

J. S. Hepburn and H.S. Gandhi, "The Relationship Between Catalyst Hydrocarbon Conversion Efficiency and Oxygen Storage Capacity", SAE paper #920831, Dated Feb. 24–28, 1992.

G. B. Fisher, J. R. Theis, M. V. Casarella, S. T. Mahan, "The Role of Ceria in Automotive Exhaust Catalysis and OBD–II Catalyst Monitoring", SAE paper #931034, Dated Mar. 1–5, 1993.

U.S. patent application S. N. 08/350,297, Filed Dec. 4, 1994, entitled "Close–coupled Catalyst" (attorney docket 3706).

U.S. patent application S. N. 08/970,259, Filed Nov. 14, 1997, entitled "Exhaust Gas Sensor" (attorney docket 7435–00010).

U.S. patent application S.N. 08/970,262, Filed Nov. 14, 1997, entitled "Apparatus and Method for Determining Catalytic Converter Operation" (attorney docket 7435–00009).

U.S. patent application S.N. 08/970,837, Filed Nov. 14, 1997, entitled "Calorimetric Hydrocarbon Gas Sensor" (attorney docket APO–1701).

U.S. patent application S.N. 08/903,524, Filed Jul. 30, 1997, entitled "Automotive On–Board Monitoring System for Catalytic Converter Evaluation" (attorney docket 4013).

*Primary Examiner*—F. Daniel Lopez
*Assistant Examiner*—Binh Tran
*Attorney, Agent, or Firm*—Frank J. Nawalanic; Richard A. Negin; J. William Dockrey

[57] ABSTRACT

An on-board catalytic monitoring system uses an intrusive technique to cause the vehicle's engine to cycle between first and second operating conditions. The first and second operating conditions are chosen such that different concentrations of emissions with different chemistries are present at the first and second operating conditions. A calorimetric sensor with a selective catalyst senses exothermic oxidation reactions produced by the emissions in the exhaust gas passing over the sensor. By matching the catalyst activity with the emission concentrations occurring at the operating conditions, the difference between the heat release sensor signals detected between the first and second operating conditions is indicative of the actual concentration of specific emissions in the exhaust gas stream. The difference or delta signal, obtained without reference to a zero point, provides an excellent correlation to the efficiency of the vehicle's catalytic converter for converting the sensed emission, i.e., hydrocarbons.

102 Claims, 13 Drawing Sheets

OBD CALORIMETRIC SENSOR SYSTEM WITH OFFSET ERROR CORRECTION

This invention relates to an on-board system for monitoring vehicular emissions and more particularly to on-board monitoring systems capable of monitoring emissions for LEV (Low Emission Vehicles) and ULEV (Ultra Low Emission Vehicles) applications.

INCORPORATION BY REFERENCE

The following patents and patent applications are hereby incorporated by reference herein so that details disclosed in the patents and patent applications related to sensors, emission systems and the like need not be repeated herein. The patents listed do not form any part of the present invention disclosed herein. The patent applications listed below (with the exception of Ser. No. 350,297) cover inventions which have been invented by one or more of the inventors of this invention and the patent applications listed below have been assigned to one or both of the assignees of the present invention. While the patent applications do not, per se, form any part of the unique invention(s) disclosed herein, they do disclose techniques and apparatus which are either utilized in the present invention or whose operation is enhanced by the present invention and to that extent this application may be viewed as a continuation or continuation-in-part of applications 2–4, all of which are hereby incorporated by reference herein and made a part hereof.

1) U.S. patent application Ser. No. 08/350,297, filed Dec. 4, 1994, entitled "Close-coupled Catalyst" (attorney docket 3706);
2) U.S. patent application Ser. No. 08/970,259, filed Nov. 14, 1997, entitled "Exhaust Gas Sensor" (attorney docket 7435-00010);
3) U.S. patent application Ser. No. 08/970,262, filed Nov. 14, 1997, entitled "Apparatus and Method for Determining Catalytic Converter Operation" (attorney docket 7435-00009);
4) U.S. patent application Ser. No. 08/970,837, filed Nov. 14, 1997, entitled "Calorimetric Hydrocarbon Gas Sensor" (attorney docket APO-1701);
5) U.S. patent application Ser. No. 08/903,524, filed Jul. 30, 1997, entitled "Automotive On-Board Monitoring System for Catalytic Converter Evaluation" (attorney docket 4013);
6) U.S. Pat. No. 5,283,383, issued Feb. 1, 1994 to Kayanuma, entitled "Method and Apparatus for Determining Deterioration of Three-Way Catalysts in Double Air-Fuel Ratio Sensors System";
7) U.S. Pat. No. 5,357,750, issued Oct. 25, 1994 to Ito et al., entitled "Method for Detecting Deterioration of Catalyst and Measuring Conversion Efficiency Thereof with an Air/Fuel Ratio Sensor";
8) U.S. Pat. No. 5,636,514, issued Jun. 10, 1997 to Seki, entitled "Catalyst Deterioration-Determining System for Internal Combustion Engines"; and,
9) U.S. Pat. No. 5,697,214, issued Dec. 16, 1997 to Carnevale et al., entitled "Electronic Concentration Control System".

BACKGROUND OF THE INVENTION

As is well known, government regulations require vehicles equipped with internal combustion engines not to emit certain specific gaseous pollutants or emissions produced by the engine beyond certain set emission threshold levels. Typically, the vehicle cannot exceed the emission thresholds when operated pursuant to a specified driving cycle such as that set forth in a FTP (Federal Test Procedure). The FTP requires that the vehicle be operated at various acceleration/deceleration modes as well as at steady state or constant velocity at various specified speeds in a standardized drive cycle. In the course of the drive cycle, the engine emits varying concentrations of specific gaseous emissions. Current laws in California, in other states, and around the world require that emission reduction equipment incorporated on a vehicle be continuously monitored by on-board diagnostic (OBD) systems. The function of these OBD systems is to report and set fault codes or alarm signals when the emission control devices no longer meet the mandated emission levels. One of the systems to be monitored is the catalytic converter which in current automotive applications is used to simultaneously reduce the levels of carbon monoxide, oxides of nitrogen ($NO_x$) and un-burnt hydrocarbons (HC) in the exhaust gases. This invention relates to such a system.

Typical emission systems currently used today employ a TWC catalytic converter (three-way catalytic converter—$NO_x$, hydrocarbons and oxides, i.e., CO). TWCs store oxygen when the engine operates lean and release stored oxygen when the engine operates rich to combust gaseous emissions such as hydrocarbons or carbon monoxide. As the TWC catalyst ages, its ability to store oxygen diminishes and the efficiency of the catalytic converter decreases. Based on this fact, current OBDs in use today comprise an exhaust gas oxygen sensor (EGO) placed upstream of the catalyst and an EGO placed downstream of the catalyst to provide some indication of the capability of the catalyst to store oxygen. This provides an estimate of a direct measurement of the oxygen storage capacity of the catalyst. Through calibration, this measurement of an estimate of the oxygen storage capacity of the catalyst can be related to the ability of the catalytic converter to convert the regulated exhaust gas emissions, i.e., the conversion efficiency of the catalytic converter.

It is also known to conventionally control the air/fuel ratio during certain portions of the driving cycle to generate rich/lean exhaust gas mixtures to measure oxygen storage capacity of the TWC. Still further, a number of before and after oxygen sensing techniques have been employed to sense when the deterioration of the catalyst has progressed to an alarm actuating condition. Reference can be had to Kayanuma U.S. Pat. No. 5,283,383; Seki U.S. Pat. No. 5,636,514; and Carnevale et al. U.S. Pat. No. 5,697,214. In at least one instance, as indicated by Ito et al. U.S. Pat. No. 5,357,750, the observation is made that when the engine is forced to operate lean, certain correlations can be made to conversion rates for nitrous oxide and when the engine is forced to operate at a richer fuel ratio, certain correlations or relationships can be made to the conversion efficiencies for hydrocarbon and carbon monoxide vis-a-vis oxygen and A/F ratio sensors upstream and downstream of the converter.

Systems that use EGO sensors and techniques based on such systems are inherently flawed because they monitor the oxygen storage capacity of the catalyst and not the gaseous emissions which must be controlled. Additionally, monitoring techniques based on catalyst deterioration by mechanisms not used to initially calibrate the catalytic converter, may result in a false identification of the status of the emission system giving erroneous fail signals or failing to give a failed signal. Attempts to address the problem are discussed in U.S. Pat. Nos. 5,283,383 and 5,636,514.

Perhaps the most substantial problems with current EGO sensor techniques using oxygen storage to either measure emissions or catalyst deficiencies are the restrictions imposed on the catalyst design and engine management strategies.

From the catalyst design viewpoint, the factors leading to the deterioration of the oxygen storage capacity of the catalytic converter and the precious metal surface area (which directly accounts for HC, CO and $NO_x$ conversion) must be roughly matched with one another so that monitoring the catalyst (which really amounts to monitoring the precious metal surface area) can be accomplished by monitoring the oxygen storage capacity. Apart from any discussion relating to restrictions imposed on the design of the catalytic converter to achieve the desired match of precious metal surface area with OSC, emission regulations now coming into effect require that the vehicle control the emissions when the engine is cold or on startup and not only when the vehicle has reached its operating temperature. This requirement is met by the use of close-coupled, light/off catalysts, which may be void of rare-earth metal oxides. Such catalytic converters lack any oxygen storage function and cannot employ or use oxygen sensors to measure oxygen storage capacity.

From the engine control standpoint, and specifically to obtain good fuel control, it is favorable to increase the air to fuel perturbation rates to 10 Hz or greater to enable optimal performance of three-way catalyst. At such rapid cycling rate, it is impossible to discern meaningful variations in oxygen storage capability.

In fact, the oxygen storage capacity of the TWC has been demonstrated to poorly correlate with hydrocarbon conversion efficiencies. See J. S. Hepburn and H. S. Gandhi, "*The Relationship Between Catalyst Hydrocarbon Conversion Efficiency and Oxygen Storage Capacity*", SAE paper 920831, 1992 and G. B. Fischer, J. R. Theis, M. V. Casarella and S. T. Mahan, "*The Role of Ceria in Automotive Exhaust Catalysis and OBD-II Catalyst Monitoring*", SAE paper 931034, 1993.

Because of all the limitations discussed above, it is generally acknowledged that dual EGO approaches develop signals with poor resolution with only the ability to determine gross changes in the catalyst conversion efficiency. The deficiencies in the OSC monitoring systems discussed above have been recognized in the prior art and to circumvent these deficiencies it is known to attempt to directly measure the emissions to determine whether the vehicle is or is not in compliance with standards. Specifically, it is known to use gas sensors of the calorimetric type to measure gaseous emissions of the vehicle. That is, emissions react with oxygen or oxidants to release heat and the heat released is measured by the calorimetric sensor. The heat sensed by the calorimetric sensor is then correlated to the emissions producing the heat release. Reference can be had to U.S. Pat. Nos. 5,444,974 to Beck et al., dated Aug. 29, 1995 and 5,451,371 to Zanini-Fisher et al., dated Sep. 19, 1995. In the '974 patent, the calorimetric device is actuated only when the air/fuel ratio is lean so that sufficient oxygen is present to promote the exothermic oxidation reactions. In the system patents which utilize the sensor described in the '371 patent, gas samples upstream and downstream of the sensor are tapped and combusted with oxygen so that rich samples of exhaust gas can be analyzed. The use of such sensors is thus limited.

Such limitations have been somewhat overcome by utilization of a solid electrolyte to generate oxygen transfer in combination with a diffusion membrane to provide, in effect, an "oxygen pump" within the calorimetric sensor so that rich combustibles in rich concentrations can be reacted. See, for example, U.S. Pat. No. 5,505,836 to Friese et al. dated Apr. 9, 1996. More recently, calorimetric sensors have been significantly improved by the designs disclosed in U.S. patent application Ser. No. 08/970,837, filed Nov. 14, 1997, entitled "Calorimetric Hydrocarbon Gas Sensor" and Ser. No. 08/970,259, filed Nov. 14, 1997, entitled "Exhaust Gas Sensor" incorporated by reference herein. Calorimetric sensors recently developed by the assignees of the present invention permit direct, dynamic measurement of gaseous emissions by simply inserting only one calorimetric sensor downstream of the catalytic converter which produces better, more consistent and reliable measurements than that capable of being achieved with EGO sensors and OSC management techniques.

It must be appreciated that the calorimetric sensors developed to date are extremely sensitive since they measure minute traces of gaseous emissions generating small heat release quantities. As the emission standards become tighter or more stringent, the sensitivity of the calorimetric sensor has to increase to detect smaller and smaller quantities of heat released by the exothermic oxidation reactions produced by smaller and smaller emissions concentrations. In addition, the sensor has to operate for "cold engine" emission detection which further complicates the problem since exhaust gas temperature for a cold engine is different than that for a hot engine. Simply increasing the gain of the sensor to increase sensor sensitivity produces excessive variations in signal output. While various filtering schemes could be utilized to cancel out some variations, a more inherent problem is present when sensitivity has to be increased to meet ultra low levels of emissions in a dynamic operating environment. More specifically, any change in heat transfer dynamically affects the base reference point or the zero point upon which the sensor measurement is based. Furthermore, the heat transfer resulting from the exhaust is several orders of magnitude larger than that attributed to heat releases of minute emission concentrations. These heat reactions, termed "secondary" only for the purposes of discussion, arise in a dynamic operating environment of the internal combustion engine. Until this invention, such secondary reactions prevented use of a calorimetric sensor to directly measure absolute values of gaseous emissions to determine whether or not such emissions comply with stringent LEV and ULEV regulations.

BRIEF SUMMARY OF THE INVENTION

It is thus an object of the invention to provide a system, method and apparatus, which enables the use of a calorimetric sensor to dynamically measure gaseous emissions and determine catalytic conversion efficiencies at very low concentrations of gaseous emissions.

This object along with other features of the invention is achieved by means of an on-board diagnostic system (OBD) (method and apparatus) for determining if the emissions of an internal combustion engine in a vehicle with a catalytic converter comply with regulatory standards which, in the method embodiment of the invention, includes the steps of providing a calorimetric sensor positioned downstream of the catalytic converter and developing electrical sensor signals indicative of the concentration of at least one, specific regulated gaseous emission in the vehicle's exhaust gases. The vehicle's engine is caused to be cyclically operated between a first operating condition producing exhaust gases having a first composition of gaseous emissions and a second operating condition producing exhaust gases having a second composition of gaseous emissions with different concentrations of specific emissions than the first mixture. A delta signal indicative of the difference between the calorimetric signals generated for the first and second gas mixtures in any given cycle is obtained and this delta signal is compared to a stored value which, in turn, is correlated to the efficiency of the catalytic converter and hence, the ability of the catalytic converter to satisfy regulatory standards whereby a relative sensor signal, independent of an absolute value, correctly senses concentrations of specific regulated gaseous emissions produced by the vehicle to determine compliance with regulatory standards.

In accordance with an important feature of the invention, the sensor's electrical signal is proportional to the exothermic oxidation reactions of the gaseous emissions sensed by the sensor. The operating conditions are selected such that at one of the operating conditions at least one specific gaseous emission is caused to be present at minimal concentrations so that the sensor detects only minor exothermic oxidation reactions at that operating condition which may be detrended to approximate a baseline value. The specific emission is present at higher concentrations at the other one of the operating conditions to cause an exothermic oxidation reaction exceeding the sensor's baseline electrical signal. The delta signal, which subtracts the baseline signal from the signal at the other operating condition, is thus a measure of the efficiency of the catalytic converter to convert substantially all of the specific regulated emission produced between a condition whereat substantially minor emission concentrations existed to a condition whereat some sensed concentration of the regulated emissions does exist.

In accordance with a specific feature of the invention, the sensor has a catalyst surface promoting CO and $H_2$ exothermic oxidation exhaust reactions with exhaust gases passing over the sensor's catalyst surface ("COS") and the first operating condition causes the engine to operate at a lean air/fuel ratio such that CO and $H_2$ is substantially not present in the exhaust gas at the sensor. The second operating condition is selected to cause the engine to operate at a rich air/fuel ratio such that exothermic reactions of CO with NO detected by the sensor changes the electrical signal from the first operating condition to produce a delta signal indicative of the concentration of $NO_x$ emissions between the two conditions. Because one of the conditions produces insignificant concentrations of CO and $H_2$, the delta signal can be viewed as a measure of the catalyst to convert all the NO in the exhaust gas.

In accordance with another specific feature of the invention, the sensor has a catalyst surface promoting exothermic oxidation reactions with all combustibles, i.e., HC, CO, NO and $H_2$ ("TC") emissions contained in the exhaust gas passing over the catalyst surface. The first operating condition is selected to cause the engine to operate at a lean air/fuel ratio such that CO and $H_2$ is substantially not present in the exhaust gas while the sensor's catalyst promotes exothermic oxidation reactions with HC present in the first condition whereby the electrical signal generated by the sensor is indicative of the HC concentrations in the exhaust gas at the first operating condition. The second operating condition is chosen such that the engine operates at a rich air/fuel ratio such that CO and $H_2$ exothermic reactions with NO principally cause a heat release sensed by the sensor such that the electrical signal generated by the sensor at the second operating condition is indicative of the $NO_x$ concentration in the exhaust gas. The signals thus sensed at each operating condition and without reference to a delta signal can be stored and statistically trended in subsets to produce indications of catalyst deteriorations for HC and $NO_x$.

However, in accordance with a particularly important feature of the invention, the sensor is provided with a first catalyst surface promoting CO and $H_2$ exothermic oxidation reactions with exhaust gases passing over the surface as described above and a second catalyst surface promoting exothermic sensor oxidation reactions with all combustibles, TC, as described above with each sensor catalyst producing a delta signal indicative of the emission concentrations, as described, such that when one delta signal is subtracted from the other, specifically, the first COS delta signal subtracted from the second TC delta signal, the resulting signal is indicative of the HC concentration in the exhaust gas. At the same time, the COS delta signal is a measure of the $NO_x$ concentration in the exhaust gas.

In accordance with another feature of the invention, somewhat separate from the features described above, the sensor has a catalyst surface promoting exothermic oxidation reactions for TC emissions and the vehicle has an exhaust gas recirculation system for metering a portion of the exhaust gas with combustion air injected with fuel into the combustion chambers of the vehicle. The method aspect of the invention includes the additional step of regulating the vehicle's exhaust gas recirculation system to inject a set percentage of exhaust gas into the combustion chambers during lambda cycling. The first operating condition is selected to cause the engine to operate at a lean air/fuel ratio such that CO and $H_2$ is substantially not present at the sensor so that the sensor detects substantially only HC concentration in the exhaust gas at the first operating condition. The second operating condition is set at a rich air/fuel ratio whereat substantially no exothermic oxidation reactions occur with the gaseous emissions and at which a baseline value may be detrended. The delta signal is now indicative of the HC concentration in the exhaust gas resulting from the lack of nitrous oxides present in the exhaust gas because of regulation of the EGR system.

In accordance with yet another aspect of the invention the cyclic operating conditions of the engine can be established by means other than the air/fuel ratio or lambda such as by cyclically retarding or advancing the timing of the vehicle or by cyclically varying the percentage of exhaust gas recirculated to the combustion chambers of the engine or, still further, with respect to lambda cycling, varying the A/F ratio from a more rich to a less rich condition or from a more lean to a less lean condition. In all instances the operating conditions are set at values such that the driveability of the vehicle is not noticeably impaired and the tailpipe emissions are not polluting while the monitoring system is active. In fact, because the system is intrusive, operating conditions, such as steady state, can be selected along with cyclical parameters, so that activation of the monitoring system is undetectable by the driver while insuring that the desired concentrations of the gaseous emissions are consistently produced by the engine.

In accordance with another important feature of the invention, the OBD system performs a diagnostic routine to insure that the catalytic converter has failed after an initial failure has been detected. In accordance with the inventive method as discussed above, additional steps include a) performing a first plurality of cycles to generate a first plurality of normal delta signals until one or more normal signals indicate a failure of the vehicle's catalyst; b) additionally varying one or more parameters selected from the group consisting of i) space velocity of said exhaust gases, ii) the temperature of said exhaust gas sensed by said sensor and iii) air/fuel ratio and/or cycling thereof by a set amount from the value said parameter had during the time said first plurality of delta signals were collected; c) performing a second plurality of operating condition cycles with said selected parameter to generate a second plurality of stressed delta signals and d) comparing said stressed delta signals to a second threshold to determine if said normal delta signals are valid so that a failure established by said normal delta signals is attributed to a failure of the catalytic converter.

It is thus an object of the invention to provide an OBD system which measures the performance of the catalytic converter to meet regulatory standards by a sensor which doesn't have an absolute reference or a zero point from which the measurements are taken.

Another object of the invention is to provide an OBD system which, under fixed conditions, directly measures the performance of the catalytic converter and correlates its performance to an efficiency measurement which in turn is correlated to an FTP to determine whether the catalytic converter meets regulatory standards.

Still another important object of the invention is to provide an OBD system which uses calorimetric sensors to sense minute emission concentrations by their heat releases while the sensor is exposed to a dynamic environment producing heat transfer several orders of magnitude greater than the heat releases attributed to the sensed emissions.

In conjunction with the immediately preceding object, an important object of the invention is to provide a system for measuring emission heat releases without reference to large heat transfers attributed to a dynamic system which otherwise prevents absolute measurements or measurements from a fixed reference or zero point.

Still another object in conjunction with the two immediately preceding objects is to provide an OBD system using a calorimetric sensor which eliminates noise inherently present in the system.

It is another object of the invention to provide an OBD system utilizing a sensor which has a good range to detect minute concentrations of emissions.

An important object of the invention is to provide an OBD system which directly measures concentration of certain specific emissions emitted by the vehicle to determine compliance with regulatory standards.

Yet another important object of the invention is to provide an OBD system to obtain a useful dynamic zero point enabling the measurement of exhaust gases with a calorimetric sensor that has a large and dynamic offset.

Yet another important object of the invention is to provide an OBD system that enables a measure of the exhaust gas composition with only one calorimetric sensor eliminating the need for a second reference calorimetric sensor and reducing sensor complexity and wire count within the sensor itself.

In accordance with the aforementioned object, a specific object of the invention is to provide a simple, cost efficient calorimetric sensor.

In accordance with a more specific object of the invention, an OBD system is provided which uses lambda cycling to produce rich side and lean side exhaust gas catalyst performance in any one of the following manners:

a) using only a total combustible calorimetric sensor in making a combined $NO_x$-HC measure;
b) using only a carbon monoxide calorimetric sensor in making an $NO_x$ measure; and,
c) using both carbon monoxide and total combustible calorimetric sensors with lambda cycling to make independent measures of $NO_x$ and HC simultaneously.

Yet another object of the invention is to provide an OBD system using a $NO_x$ non-reactive sensor catalyst to make an HC measurement with lambda cycling.

A general object of the invention is to provide an OBD monitoring system which uses relative measurements of a sensor to obtain generally absolute measurements of gaseous emission concentrations in the exhaust gas.

Another significant object of the invention is to provide an intrusive OBD monitoring system to evaluate catalytic conversion efficiency which does not adversely affect vehicle driveability when actuated or cause tailpipe emissions exceeding regulatory standards.

Yet another important, specific object of the invention is to provide an OBD system using EGR to remove rich side $NO_x$ chemistry to make an HC measurement with a total combustible calorimetric sensor with lambda cycling.

Yet another more specific object of the invention is to provide an OBD monitoring system which allows catalytic converter, specifically close-coupled catalytic converters, to be developed with improved HC efficiency.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and an arrangement of certain parts taken together and in conjunction with the attached drawings which form a part of the invention and wherein:

FIG. 3b is a trace or graph of hydrocarbons emitted for the lambda cycling shown in FIG. 3a;

FIG. 3c is a trace or graph showing exothermic oxidation reactions attributed to emissions emitted during the lambda cycling shown in FIG. 3a;

FIG. 5 is a graph showing thermal heat releases calculated for exothermic oxidation reactions of certain emissions as would be detected by two different calorimetric sensors when an engine is cycled about lambda as shown in FIG. 3a;

DETAILED DESCRIPTION OF THE INVENTION

Figure 1:
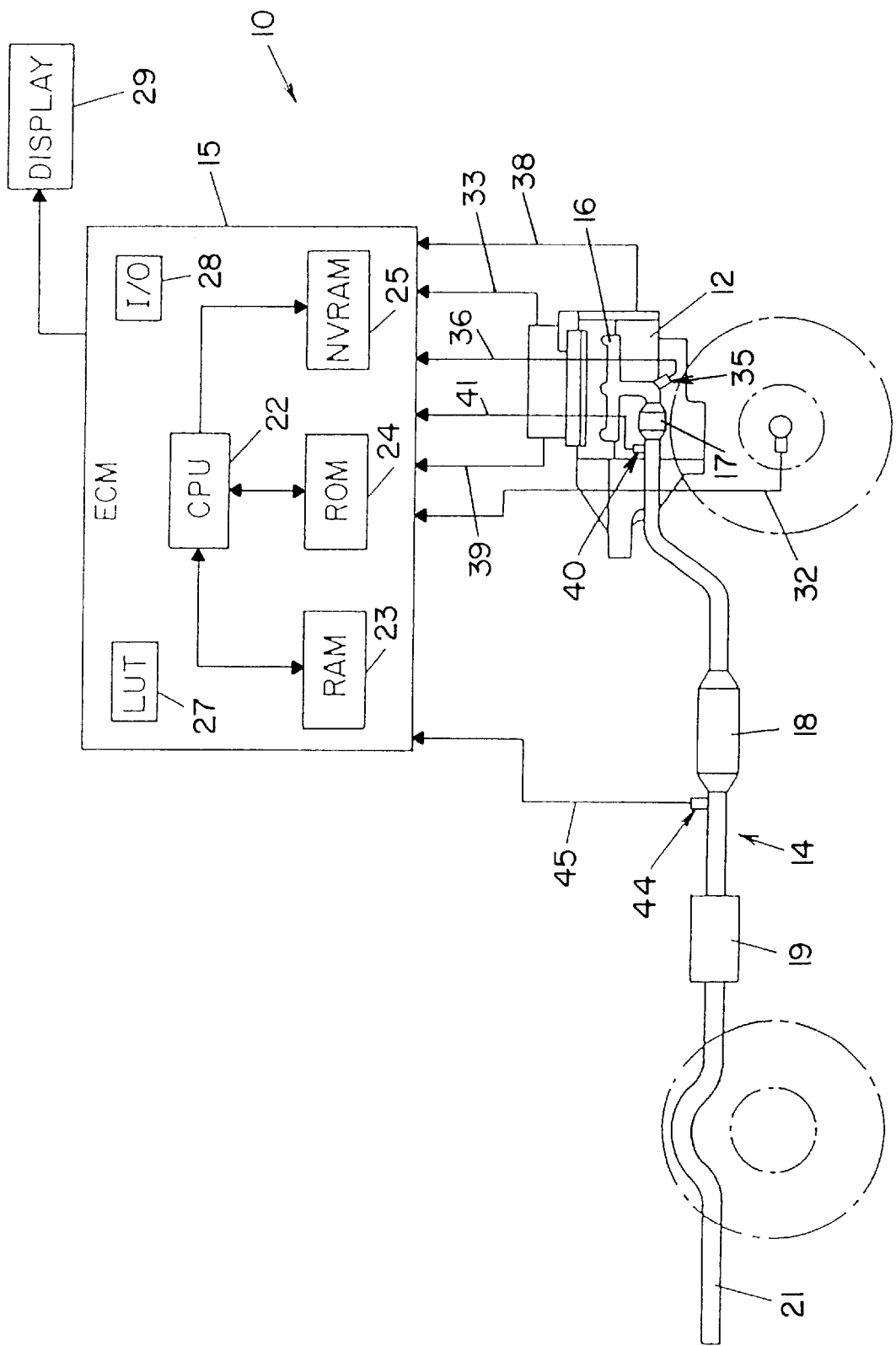
FIG. 1 is a general diagrammatic illustration of the vehicular components of an emission system.

Referring now to the drawings wherein the showings are for the purpose of illustrating a preferred embodiment and alternative embodiments of the invention only and not for the purpose of limiting same, there is generally shown in diagrammatic form in FIG. 1 the principle components of a vehicular, catalytic converter, emission control system 10.

A) The System Hardware

The vehicle has an internal combustion engine 12 which during operation discharges gaseous pollutants or emissions through an exhaust system 14. Internal combustion engine 12 is conventionally under the control of an electronic control module or ECM 15 (controller or computer).

Exhaust system 14 is somewhat conventional and includes an exhaust header 16, a light/off, close-coupled catalytic converter 17 spaced closely adjacent exhaust header 16. Downstream from close-coupled catalyst 17 is a 3-way catalytic converter or TWC 18, a muffler 19 downstream of TWC 18 and a tail pipe 21 downstream of muffler 19 which is open to atmosphere for discharging or emitting the emissions or gaseous pollutants produced by internal combustion engine 12. ECM 15 is conventional and includes well known elements such as a central processing unit or CPU 22, RAM (Random Access Memory) 23, ROM (Read Only Memory) 24 and NVRAM (Non-Volatile Random Access Memory) 25. Also included is a lookup table 27 shown separate and apart from ROM 24 (or alternatively included as a component of ROM 24). Also shown is a conventional input/output (I/O) unit 28 for receiving and transmitting appropriate instructions from and to ECM 15. Insofar as the present invention is concerned, I/O unit 28 will transmit appropriate instructions to actuate a display failure light 29 situated in the vehicle. Alternatively or coincident with the actuation of display failure light 29 is the storage of a failure code in memory by CPU 22. Communication between ECM 15 and actuation units on the vehicle, including sensors associated therewith, is typically carried out by analog signals from the sensors digitized at the periphery of the ECM (by appropriate A/D converters and appropriate D/A converters sending back analog signals to actuation units). ECM 15 operates in a well known manner to control the engine and process engine control and diagnostic routines, such as stored by step-by-step instructions in ROM 24. As is well known, engineering operating parameters are read into ECM 15 as input signals which are then processed into output signals or control signals outputted from ECM 15 to actuation units on the vehicle controlling the vehicular operation, specifically, the operation of internal combustion engine 12. Insofar as the general operative concepts of the present invention is concerned, input signals are read into ECM 15, processed by RAM 23 and NVRAM 25 under the control of CPU 22 from algorithm routines stored in ROM 24. Data stored in memory including LUT 27 is then accessed by RAM 23 and NVRAM 25 through algorithms stored in ROM under the control of CPU 22 to generate signals outputted by I/O unit 28 to display 29 or stored in codes, for example in NVRAM 25.

As thus far described, the system is conventional. However, close-coupled catalyst 17, when used as part of the exhaust emission system, is a relatively recent development and reference should be had to U.S. patent application Ser. No. 08/350,297 hereby incorporated by reference herein for a more detailed explanation of close-coupled catalyst 17 and a system for use therewith than that which will be discussed herein. As will be explained hereafter, the invention specifically contemplates and is even designed for use with a close-coupled catalyst.

Close-coupled catalysts have been designed to reduce hydrocarbon emissions from gasoline engines during cold starts. More particularly, the close-coupled catalyst is designed to reduce pollutants in automotive engine exhaust gas streams at temperatures as low as 350° C., preferably as low as 300° C. and more preferably as low as 200° C. The close-coupled catalyst of the present invention comprises a close-coupled catalyst composition which catalyzes low temperature reactions. This is indicated by the light-off temperature. The light-off temperature for a specific component is the temperature at which 50% of that component reacts.

Close-coupled catalyst 17 is placed close to engine 12 to enable it to reach reaction temperatures as soon as possible. However, during steady state operation of the engine, the proximity of the close-coupled catalyst to engine 12, typically less than one foot, more typically less than six inches and commonly attached directly to the outlet of the exhaust manifold exposes the close-coupled catalyst composition to exhaust gases at very high temperatures of up to 1100° C. The close-coupled catalyst in the catalyst bed is heated to high temperature by heat from both the hot exhaust gas and by heat generated by the combustion of hydrocarbons and carbon monoxide present in the exhaust gas. In addition to being very reactive at low temperatures, the close-coupled catalyst composition should be stable at high temperatures during the operating life of the engine. TWC 18 downstream of the close-coupled catalyst can be an underfloor catalyst or a downstream catalyst. Close-coupled catalyst 17 increases the gas temperature through conversion of HC and CO which, in turn, enables the downstream catalyst TWC 18, typically the underfloor three-way catalyst, to run more effectively at a higher temperature. The downstream or underfloor catalyst 18 preferably comprises an oxygen storage component.

Close-coupled catalyst 17 preferably is in the form of a carrier supported catalyst where the carrier comprises a honeycomb type carrier. Essentially, close-coupled catalyst has substantially no cerium oxide and praseodymium oxide. More particularly, the catalyst composition includes a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components; and optionally a second zirconium oxide. Some close-coupled catalyst have also optionally included at least one rare earth oxide selected from the group consisting of neodymium oxide and lanthanum oxide. However, neither lanthanum or neodymium is necessary. More specifically, the preferred composition is from about 75 to 300 g/ft$^3$ of the palladium components; from about 0.75 to about 2.02 g/in$^3$ of activated alumina support; from about 0.05 g/in$^3$ to about 0.4 g/in$^3$ of strontium oxide; from about 0.05 to about 0.2 g/in$^3$ of barium oxide; and from about 0.05 to about 0.5 g/in$^3$ of the second zirconium oxide.

Referring still to FIG. 1 there are a number of sensors on a vehicle generating signals used by ECM 15 to control the vehicle. Typical sensors which generate operative signals indicative of an operating condition of the vehicle include a vehicle speed sensor generating vehicle speed signals on line 32; a solenoid valve controlling the amount or percentage of exhaust gas recirculation (EGR) metered back to the engine's combustion chambers generating signals on line 33 in engine 12; an air to fuel ratio sensor, preferably a HEGO sensor 35, positioned upstream of close coupled catalyst 17 for generating signals on line 36 indicative of the air to fuel ratio of the exhaust gas upstream of the catalytic converter for controlling the ratio of air to fuel fed to engine 12 controlling combustion at ranges over and about stoichiometric; a timing sensor for generating engine timing signals on line 38 (spark, fuel or valve) whereby a portion of the engine operation may be advanced or retarded and a miscellaneous signal schematically shown at line 39 and indicative of other operating signals such as exhaust gas temperature, mass air flow, manifold pressure, etc. Again, all such sensors and the signals developed therefrom are conventionally used in today's vehicles.

The only hardware item which is different from that now supplied on the vehicle (and which simply replaces an existing EGO sensor now used in OSC systems) is a calorimetric sensor 40 positioned immediately downstream of close coupled catalyst 17 and generating electrical sensor signals on line 41 to ECM 15. Optionally shown is a second calorimetric sensor 44 downstream of TWC 18 generating electrical sensor signals on line 45 to ECM 15. Second calorimetric sensor 44 is an option which is not necessary if the vehicle is equipped with a close coupled catalyst 17. It is shown simply to illustrate the position of the calorimetric sensor if the vehicle is not equipped with a close coupled catalyst or, alternatively, it may be used in lieu of first calorimetric sensor 40 or simply as an additional verifying sensor. In the preferred embodiment, all measurements are simply taken at calorimetric sensor 40 immediately downstream of close-coupled catalytic converter 17.

Reference should be had to U.S. patent application Ser. No. 08/970,259, filed Nov. 14, 1997, entitled "Exhaust Gas Sensor" and U.S. patent application Ser. No. 08/970,837, filed Nov. 14, 1997, entitled "Calorimetric Hydrocarbon Gas Sensor" hereby incorporated by reference herein for a more detailed explanation of the composition and electrical circuitry used in calorimetric sensor 40 than that set forth herein.

Figure 2:
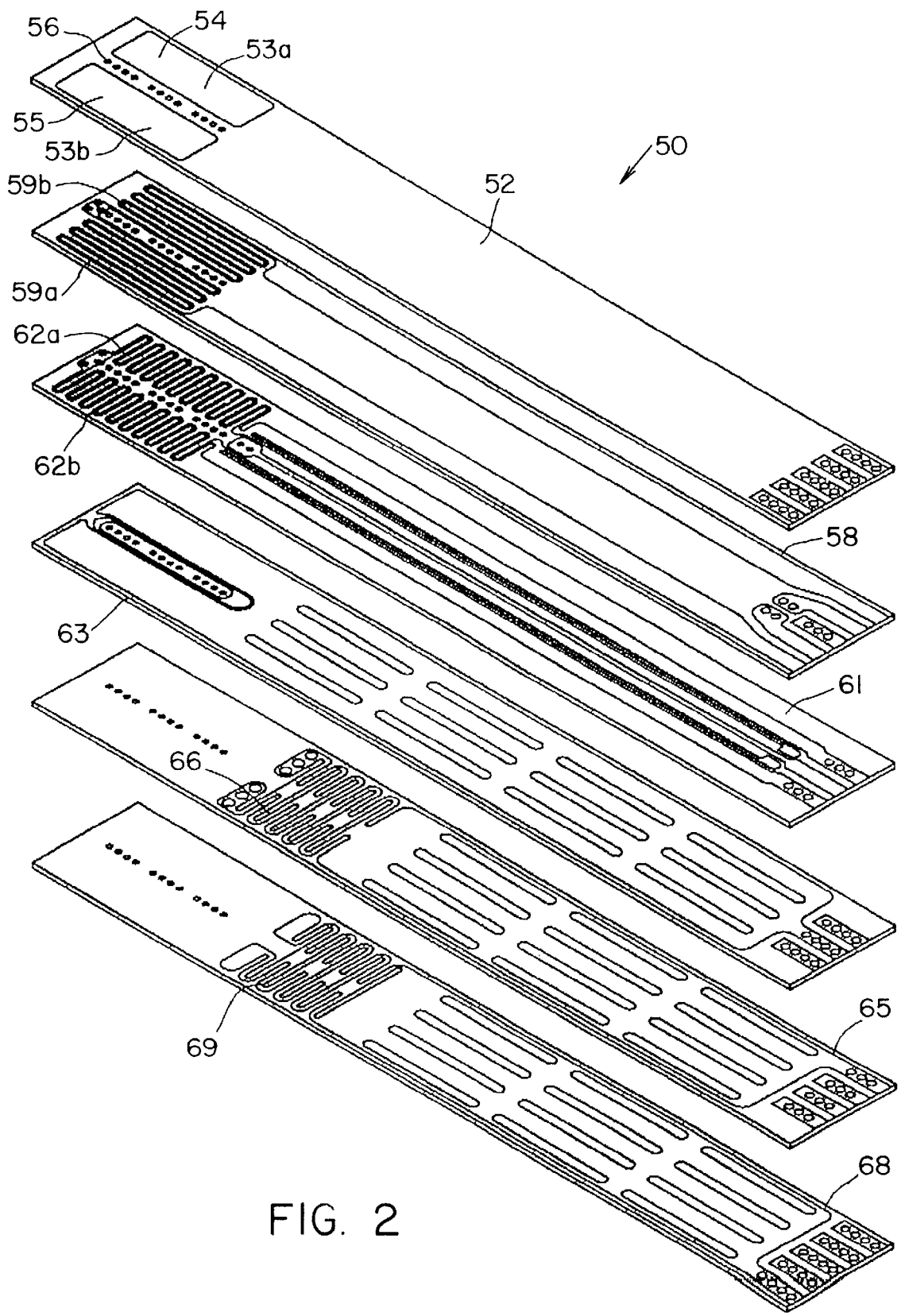
FIG. 2 is a perspective overlay view of the components of a calorimetric sensor used to sense emissions pursuant to the invention.

Referring now to FIG. 2 there is generally shown in perspective view only a substrate portion of calorimetric sensor 40 which is believed sufficient to show how sensor 40 functions to generate the signals used in the invention. Not shown is an electrochemical "oxygen pump" which is secured to and situated under the substrate shown in FIG. 2. This electrochemical-pump is an electrolyte such as yttrium stabilized zirconia having inner and outer electrodes so that when a voltage is placed across the electrodes, oxygen ions (resulting from oxygen compounds in the exhaust gas) travel across the electrodes to enter the substrate configuration disclosed in FIG. 2 and provide oxygen for exothermic oxidation reactions. Also not shown in FIG. 2 is a diffusion barrier surrounding at least the top portion of the substrate illustrated in FIG. 2 which limits the amount of exhaust gas sensed by the substrate but does not change the composition of the exhaust gas concentrations. Nevertheless, it should be noted that hydrogen ($H_2$) diffuses more rapidly through the diffusion barrier than other emission compounds.

Multi layered substrate 50 (which essentially makes up calorimetric sensor 40) comprises a plurality of ceramic layers which, with the exception of top layer 52, supports screen-printed metalization defined in different patterns to form the various functional elements necessary to measure and control temperature within calorimetric sensor 40. More specifically, top layer 52 is shown for discussion purposes only, to have two active regions 53a, 53b. In one embodiment of the invention and in one active region, a first catalyst 54 is disposed and in the other region, a second catalyst 55 is disposed. Between regions 53a and 53b is a plurality of vias 56 through which oxygen generated by the electrolyte discussed above diffuses. Vias 56 are present in each one of the layers for oxygen flow to the catalysts. Immediately beneath top layer 52 is first intermediate layer 58 which has resistance temperature devices (RTDs) 59a, 59b underlying active regions 53a, 53b respectively. Underlying first intermediate layer 58 is a second intermediate layer 61 which contains resistance heating elements 62a, 62b underlying first and second active regions 53a, 53b respectively which will hereafter be termed compensation heater 62. A third intermediate spacer element 63 is provided and underneath third intermediate layer 63 there is a fourth intermediate layer 65 containing a primary heating element 66 and a fifth or bottom layer 68 also containing a primary heating element 69.

In operation, voltage is applied to primary heating elements 66, 69 to bring calorimetric sensor 40 to a predetermined stable temperature as measured by one of the RTDs 59a or 59b. As exothermic reactions develop on catalyst surfaces 54, 55 different temperature rises occurring over regions 53a, 53b will be sensed by RTDs 59a, 59b. To compensate for the rises detected by RTD's 59a, 59b, an applied voltage will be supplied (actually reduced) compensation heaters 62a, 62b to bring RTD readings 59a, 59b into balance. This power adjustment necessary to return RTDs 59a, 59b to equal resistances (temperatures) is proportional to the difference in the exothermic oxidation heat generated by the reactions promoted vis-a-vis catalysts 54, 55. Reference should be had to U.S. patent application Ser. No. 08/970,837, Filed Nov. 14, 1997, entitled "Calorimetric Hydrocarbon Gas Sensor" for a detailed description and showing of the specific circuitry utilized to raise the temperature to bring active regions 53a, 53b into balance with one another.

Standard practice is to apply a non-reactive type catalyst to one of the active regions 53a, 53b and which functions as a reference signal while an active catalyst is applied to the other active region 53a or 53b. As to the composition of the catalyst for first and second catalyst 54, 55, reference should be had to U.S. patent application Ser. No. 08/970,259, filed Nov. 14, 1997, entitled "Exhaust Gas Sensor" which defines a number of catalyst compositions which can be utilized to promote the selected exothermic oxidation reactions defined herein.

There are some modifications to calorimetric sensor 40 when used for this invention. As will be explained below, a relative or a difference signal is used in the invention. Thus, there is no need for a reference catalyst developing a variable signal indicative of an absolute reference point or a zero. When calorimetric sensor 40 is used in its simplest form, only one catalyst surface 54 or 55 is used. (This allows utilization of a larger catalyst surface area within the space confines of the sensor and a more responsive signal. The substrate shown in FIG. 2 is figuratively split down the middle reducing the "wire count" of the device.) Then, the signal developed by RTD 59 is compared to a fixed reference signal of a set resistance and not to a varying catalyst reference signal. More particularly, any balancing circuit can be used to ascertain the temperature rise sensed by RTD 59. For explanatory purposes, a Wheatstone bridge can be envisioned with RTD 59 comprising the resistance in one leg compared against a set reference resistance in another leg of the bridge. The reference resistance is set at a resistance determined when calorimetric sensor 40 is calibrated. The voltage change needed to bring the bridge into balance is then inputted to compensation heater 62. It should be noted that the emission reactions are principally exothermic generating heat releases increasing the resistance of RTD 59. The power (mW) inputted to compensation heater 62 has to be reduced to bring the bridge back into balance since the function of primary heating elements 66, 69 is to eliminate the steep thermal gradient between compensation heater 62, RTD 59 and the sensor base. Thus, the power delta signal referred to in the description of the invention below is negative.

B) The System Method

Having now defined the components which make up the OBD system of the present invention, it should be restated that one of the primary objectives of the system is to utilize a sensor which directly measures the specific concentrations of the regulated emissions and not some other quantity which supposedly bears some relationship to the regulated emission which can somehow be extrapolated to an assumed emission. As discussed, the extrapolations and the assumptions simply don't correlate at the low concentration levels being mandated or shortly to be mandated under government regulations. The low emission levels produce sensitivity problems without even discussing other factors such as drift inherently arising in any measuring instrument.

There must be an understanding of the parameters affecting the production of the emissions and the reaction of the regulated emissions which occur if the gaseous emissions are to be directly measured. In point of fact, several underpinnings of the present invention are based upon an understanding of such parameters leading to observations and selected combinations resulting therefrom to produce the OBD system. More specifically, HC conversion is related to the air to fuel (A/F) ratio, exhaust gas space velocity and exhaust gas temperature.

The A/F ratio varies under different operating conditions but is well defined and closely controlled through ECM 15. The A/F ratio is usually expressed as lambda, $\lambda$. Lambda is a dimensionless parameter expressed by the following equation:

$$\lambda = \text{instantaneous A/F ratio/stoichiometric A/F ratio}$$

When lambda equals 1, the A/F ratio produces stoichiometric combustion. When lambda is greater than 1 ($\lambda > 1$) the A/F ratio supplied to the vehicle causes the engine to operate lean or at excess air. When lambda is less than 1 ($\lambda < 1$) the vehicle is operating rich or with excess fuel.

The space velocity can be estimated for some vehicles which have mass air flow (MAF) sensors but in other vehicles has to be indirectly estimated based upon manifold air pressure (MAP), throttle position, engine rpm, etc. Finally, at least at this time, production vehicles are not equipped to provide catalyst temperature measurements. All of the factors discussed contribute to and prevent the making of an absolute sensor measurement of regulated emission concentrations at the low levels mandated today.

The basic process implemented by the OBD system of the present invention uses "on-off" intrusive measurements to account for all of the factors. The basic process of the invention may be summarized as follows:

A) Operate the engine at two different conditions, each of which produces exhaust gases having different concentrations of specific gaseous emissions. In the preferred embodiment the operating condition is lambda but the invention in its broader sense is not limited to lambda. Examples of other operating condition variations in lieu of lambda could include engine timing or a variation in the exhaust gas recirculated to the engine's combustion chambers by the EGR system.

B) Make measurements of the exhaust stream chemistries at the two operating conditions selected in accordance with step (A). As will be demonstrated below, the sensor making the measurement, a calorimetric sensor, will be designed to have certain detecting characteristics matching it to the gas compositions produced in step (A).

C) Subtract the two sensed signals to produce a delta signal indicative of the difference between the exhaust chemistries measured at the two operating conditions. This relative signal is independent of other zeros and removes the problem of making an absolute measurement addressing the inherent drift in the sensor measurements. As will be shown, by selecting steps (A) and (B) to precisely measure certain emissions, step (C), which generates a relative signal, a delta signal, nevertheless is a precise measurement of absolute quantities of concentrations of specific gaseous emissions within the exhaust stream.

D) The delta signal is then correlated to catalyst performance. Since the process is intrusive, a relative measure of performance enables the efficiency of the catalyst to be ascertained and the emission conversion calculated without complicated routines based on observer techniques correlated to drive cycles established by FTPS. In the invention's simplest form, a single delta signal determines whether the catalytic converter operates at an acceptable pass/fail level.

Figure 3A:
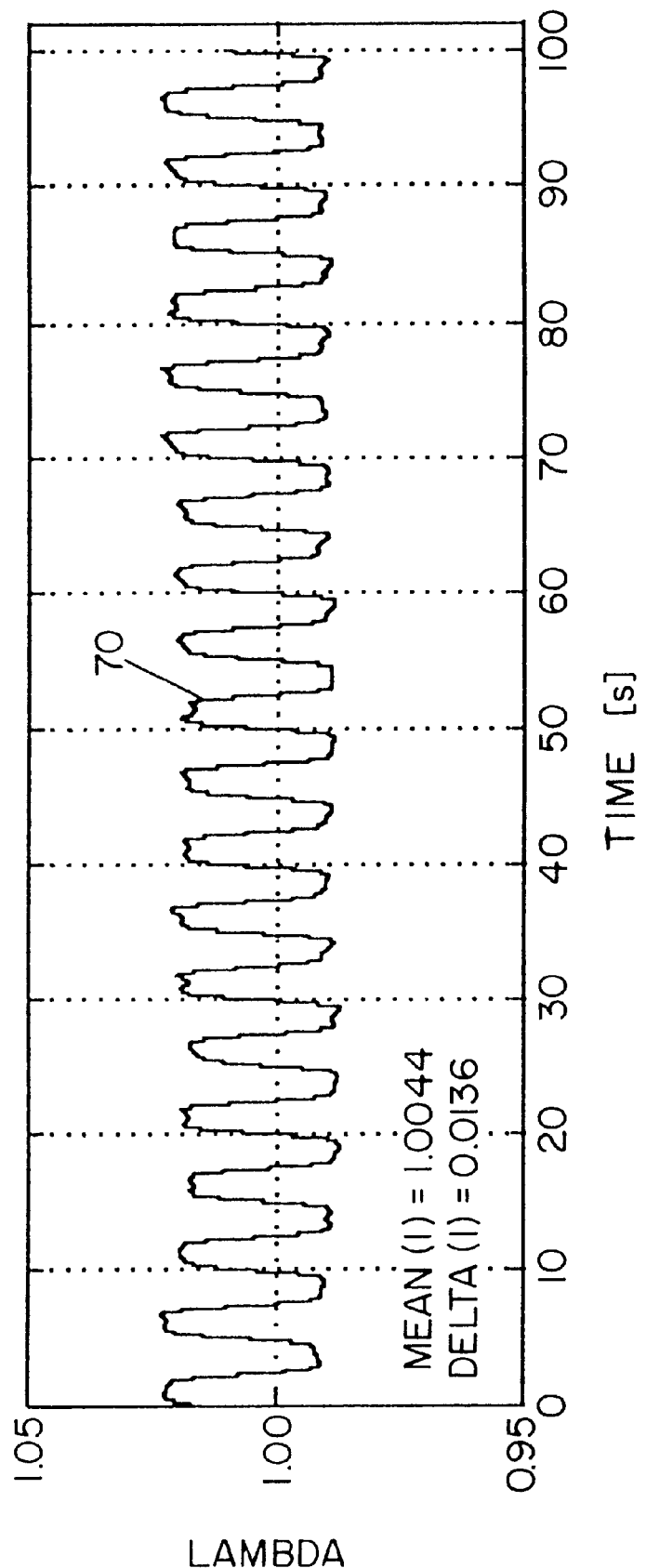
FIG. 3a is a trace or graph of lambda cycles occurring over time.
Figure 3B:
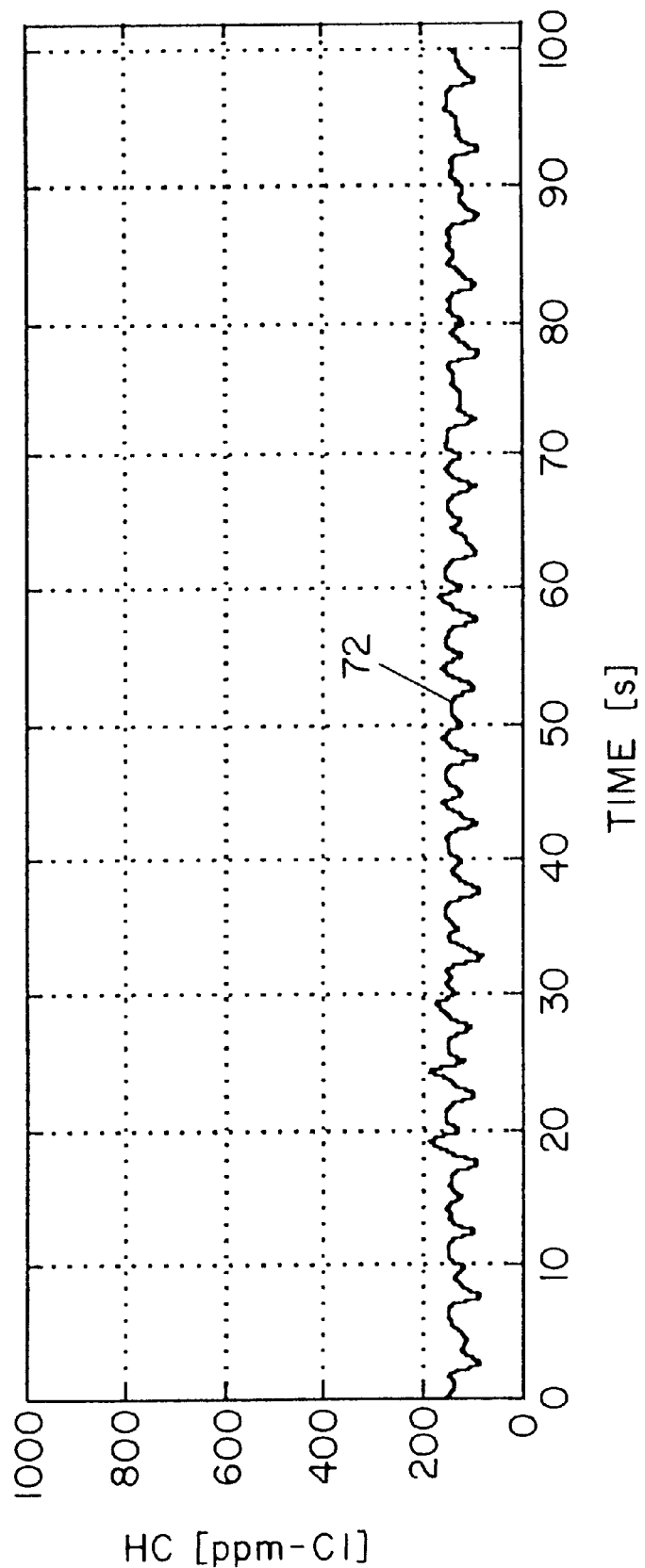
Figure 3C:
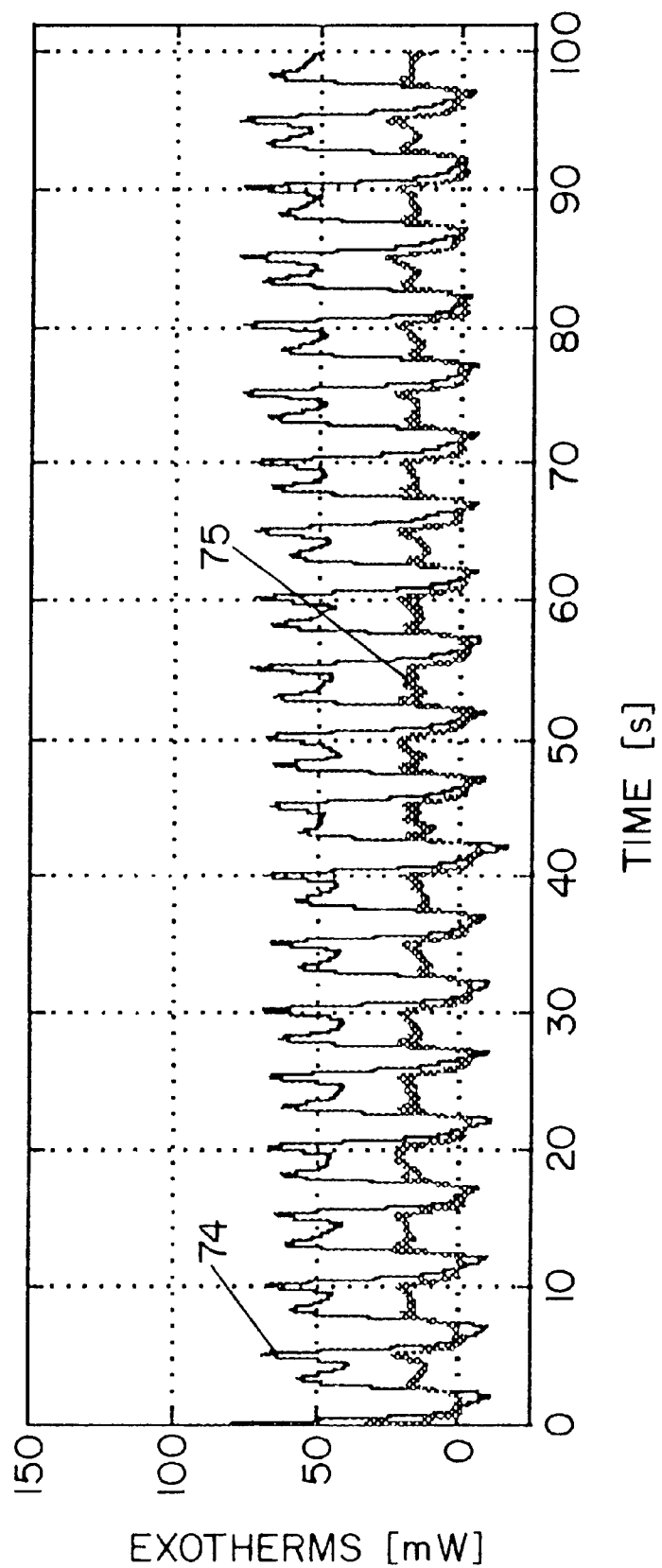

Referring now to FIGS. 3a, 3b and 3c, a trace designated by reference numeral 70 is shown in FIG. 3a indicating a lambda cycling of the vehicle. That is, the operating condition specified for step (A) is chosen as lambda in the preferred embodiment of the invention. More specifically, the period is set at 5 seconds, i.e., the time it takes to cycle from one operating condition to the second operating condition and back to the first operating condition. The amplitude is chosen at a low value typically about one to two percent about stoichiometric (to avoid adversely affecting engine operation and emissions). For the trace illustrated in FIG. 3a, the mean lambda is set at a slight excess air value of 1.004 and the amplitude is set at 0.014 lambda. This results in cycling from rich to lean and back. However, in accordance with the broader concepts of the invention, the operating conditions for lambda could be set to operate from a lean to a more lean condition or from a rich to a more rich condition. The cycle for FIG. 3a (which again is the operating conditions at which the sensor measurements are extracted) was chosen because it would have no noticeable effect on the driveability of the vehicle when the vehicle was operating at steady state conditions and probably would not be noticeable even under some acceleration/deceleration modes. Significantly, the cycle is not polluting. Tailpipe out emissions are within the regulating standard if the catalytic converter operates at acceptable efficiency levels. It should also be noted that the cycling strategy illustrated in FIG. 3a is conventionally used for OSC management techniques. When compared to conventional cycling used in OSC, the selected period of five seconds is slightly longer but less than that used by at least some major auto manufacturers today.

Referring now to FIG. 3b, the hydrocarbon (HC) concentrations emitted by the engine when operated at the lambda cycling of FIG. 3a is shown by the trace indicated by reference numeral 72. The HC concentrations were measured with a Combustion Fast FID analyzer after the exhaust gases had passed through close-coupled catalyst 17. This first "brick" had a volume of 32 in$^3$ and had been aged to approximately the diagnostic threshold. That is, close-coupled catalyst 17 was thermally aged at 1200° C. for eight hours which means that the conversion efficiency of close-coupled catalyst 17 had aged to the threshold failure point, i.e., the catalyst efficiency has dropped almost to the point where it no longer meets emission standards and must be replaced. Also, the HC measurements were taken with the engine speed at a constant 1,500 rpm and a manifold air pressure (MAP) at 40 kPA. Lambda was measured with UEGO sensor 35 but downstream of close-coupled catalyst 17 (not shown in FIG. 1).

Referring now to FIG. 3c, for the lambda cycle shown in FIG. 3a developing the HC emissions shown in FIG. 3b, a calorimetric sensor 40 which senses only carbon monoxide (hereafter referred to as COS sensor 40a) produces a signal trace indicated by reference numeral 74 in FIG. 3c. (A COS selective catalyst can be a catalyst containing rhodium and bismuth on ceria zirconia as disclosed in patent application Ser. No. 08/970,259, filed Nov. 14, 1997, entitled "Exhaust Gas Sensor".) Similarly, a calorimetric sensor 40 used in the present invention measuring the total combustibles present in the exhaust gases (hereafter referred to as TC sensors 40b) develops a TC signal trace indicated by reference numeral 75. (A TC catalyst can be platinum rhodium catalyst impregnated into a prestabilized alumina as disclosed in patent application Ser. No. 08/970,259, filed Nov. 14, 1997, entitled "Exhaust Gas Sensor".) The y-axis of FIG. 3c is designated exotherms and is expressed in milliwatts which is the power change to compensation heater 62 to bring the RTD 59 into balance as a result of the heat release from exothermic oxidation reactions as discussed above. The actual signal plotted is the negative electrical powers of the individual compensation heaters which have been detrended from the points during the lean ($\lambda$<1) portion of the cycle. The signal from the sensor used for diagnostic purposes, i.e., step (C), is the delta of the processed signal, or simply, the delta between the electrical powers lean to rich (equals minus [rich−lean]). Graphically, the delta signal is the difference between the peaks and the valleys shown in FIG. 3c for the COS sensor plot 74 if the COS sensor is used and is the difference between the peaks and the valleys for TC plot 75 if the TC sensor is used. When both COS and TC sensor 40a, 40b are used, then the calorimetric sensor 40 shown in FIG. 2 can have COS selective catalyst at one active region 53a or 53b and TC catalyst at the other active region 53b or 53a. While each sensor 40a, 40b can have its delta signal separately computed as discussed above, one sensor's signal 40a or 40b can be balanced against the other sensor's signal 40b or 40a to immediately generate a delta signal from the individual delta signals of COS sensor 40a and TC sensor 40b.

C) The System Theory

As used throughout this patent, certain terminology will have the following meanings:
1) "Exothermic oxidation reactions" includes also oxidation reduction reactions as well as combustion reactions.
2) "Exotherm" means an exothermic oxidation reaction attributed to a heat release reaction of an emission.
3) "Baseline" means the reference value of heat releases attributed to exothermic oxidation reactions of measured emissions. It is not a reference value with respect to the heat transfer sensed by the system or sensor.

Figure 4:
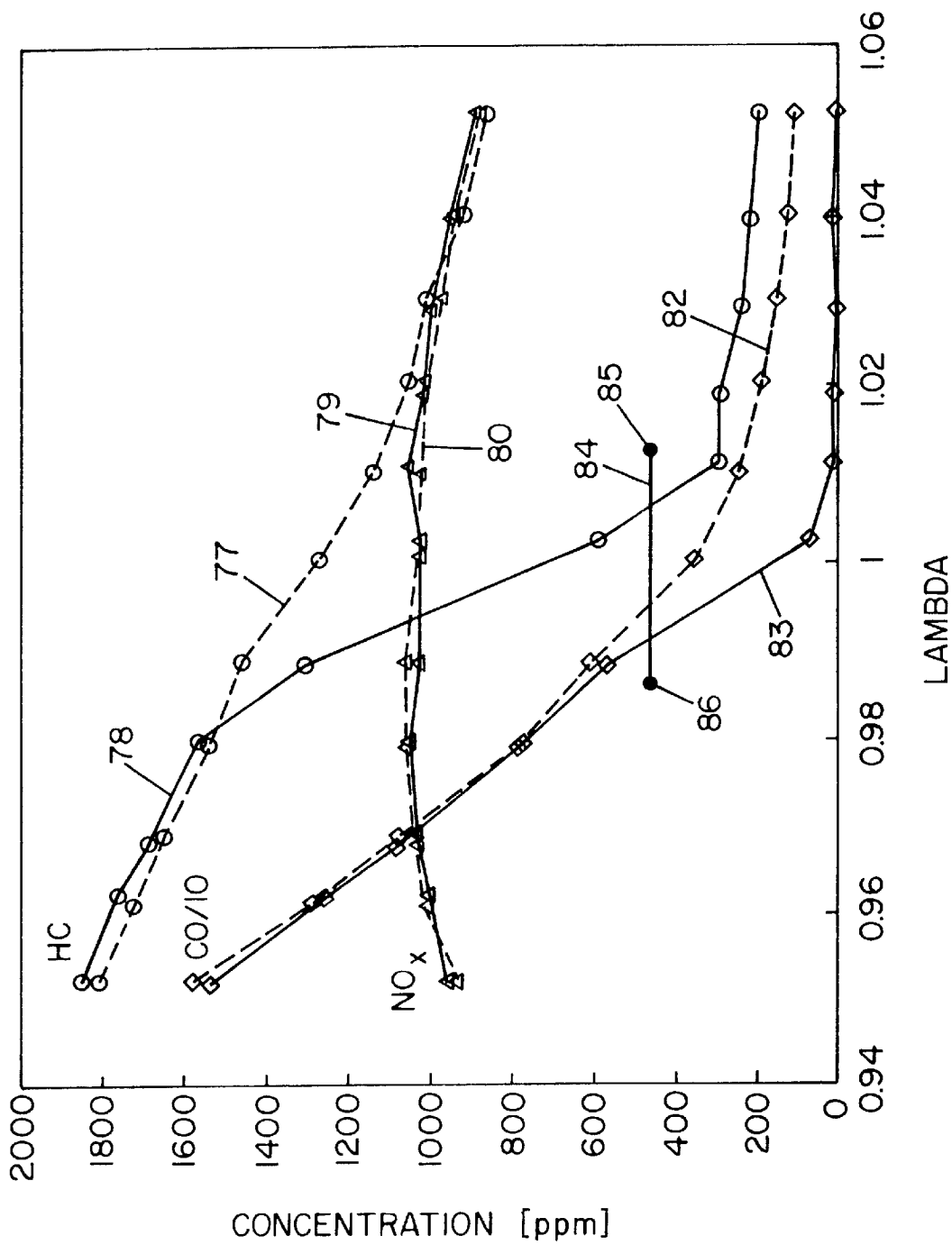
FIG. 4 is a graph of certain emission concentrations in the exhaust gas before and after the catalytic converter for various lambda values.

Referring now to FIG. 4, there is shown a number of constructed graphs illustrating the concentration of certain selective gaseous emissions before entering catalytic converter 17 and after passing through catalytic converter 17 for various lambda operating conditions of the engine. It should also be noted that the graphs depicted are for the close-coupled catalytic converter aged to the point where it is at threshold failure. Thus, the designation of emission concentrations after the emissions pass through catalytic converter 17 is a worst case condition.

Dashed line graph 77 passing through circles shows the concentration of hydrocarbons for various lambda operating ranges of engine 12 before passing through catalytic converter 17. It can be concluded from graph 77 that as the engine is forced to run at leaner conditions, the engine emits slightly less concentrations of hydrocarbons. The solid line graph 78 passing through circles shows that there is little difference between the HC concentrations produced by the engine before and after passing through catalytic converter 17 for rich mixtures having a lambda less than 0.98. However, as the engine operates close to stoichiometric, the HC concentration, after it has passed through catalytic converter 17, drops dramatically until reaching a slightly lean ratio of lambda of about 1.01 and thereafter levels off at some reduced concentration.

The graph shown as a solid line passing through triangles and indicated by reference numeral 79 indicates the concentration of $NO_x$ after leaving the catalyst and should be compared to the graph shown as a dashed line passing through triangles and indicated by reference numeral 80 which shows the concentration of $NO_x$ leaving engine 12 but before passing through catalytic converter 17. There is no effect on $NO_x$ concentrations before or after close-coupled catalyst 17 (which is expected since close-coupled catalyst 17 is not a TWC catalytic converter and is designed for HC emission reduction) and variations in lambda do not effect $NO_x$ concentrations.

Dashed line graph passing through diamonds and indicated by reference numeral 82 shows the concentrations of carbon monoxide for various lambda operating conditions of the engine before passing through catalytic converter 17. Graph 82 shows a rather dramatic decrease in CO emissions as the engine changes from rich air/fuel ratios to lean air/fuel ratios. Solid line graph passing through diamonds and indicated by reference numeral 83 shows CO concentrations in the exhaust gas after passing through catalytic converter 17 for various lambda engine operating conditions. Even though the catalyst is at threshold failure, CO emissions downstream of the catalyst are reduced almost to zero when the engine is operating lean.

The tests at which these emission concentrations were recorded were at steady state engine out conditions and post catalyst emissions were measured with standard emissions bench analyzers. Engine speed was at 1500 rpm and a manifold air pressure at 40 kPA. Catalytic converter 17 was an Engelhard type HEX 1107. The tests did not measure hydrogen concentrations because of the difficulty in measuring that emission attributed to the rapid reaction state of the emission. For a number of reasons which are too detailed and extensive to discuss herein, it is believed that the $H_2$ emissions would closely follow the graphs demonstrated for carbon monoxide. Specifically, $H_2$ emissions would have a decreasing concentration rate as the engine was operating towards the leaner condition and the $H_2$ concentration would significantly diminish to zero at lean conditions downstream of the catalyst.

In accordance with the invention, and in accordance with the preferred embodiment, engine 12 is cycling between lambda conditions designated by line 84 extending between lambda lean limit point 85 and lambda rich limit point 86.

The invention next determines the chemistries of the emissions which produce heat release reactions, i.e., exothermic oxidation reactions, at the intrusive operating conditions established or selected. In the preferred embodiment, lambda is selected as the intrusive parameter under which the catalytic converter efficiency will be measured and specifically, lambda will be cycled between rich and lean A/F ratios such as discussed with reference to FIG. 4. Next, a sensor catalyst will be selected which will promote certain heat release reactions which in turn will be coordinated with the lean/rich chemistries resulting from the operating conditions. The sensor will generate a changing signal where the change is indicative then of the emission concentration.

The following exothermic oxidation reactions can occur for the emissions discussed with reference to FIG. 4 as follows:

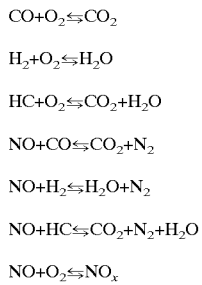

$$CO + O_2 \leftrightharpoons CO_2$$

$$H_2 + O_2 \leftrightharpoons H_2O$$

$$HC + O_2 \leftrightharpoons CO_2 + H_2O$$

$$NO + CO \leftrightharpoons CO_2 + N_2$$

$$NO + H_2 \leftrightharpoons H_2O + N_2$$

$$NO + HC \leftrightharpoons CO_2 + N_2 + H_2O$$

$$NO + O_2 \leftrightharpoons NO_x$$

Certain oxidation reactions will occur quicker or earlier than others. For example, on the rich side, $H_2$ diffuses quickly to the catalyst in the calorimetric sensor and thus will react quickly with $O_2$ and NO prior to other reactions occurring. In addition, the heat release for certain emissions can be significantly greater than that for other emissions. However, most importantly, by controlling engine operation, concentration of certain emissions is simply limited or minimized to the extent that such emissions do not contribute any appreciable heat to the measurement.

The delta measurement described above in step (C) measures the difference of the rich side chemistries and the lean side chemistries. On the lean side with excess oxygen, the main chemistries that the calorimetric sensors measure are the exothermic reactions of HCs with oxygen on the TC calorimeter 40b and only very little CO or $H_2$ combustion on the COS calorimeter 40a (COS calorimetric sensor 40a doesn't promote reactions with HC). Exothermic oxidations of CO and HCs with NO are minor contributions to total heat release on the lean side. Note that normally the HC levels are much higher than the CO level and this fact coupled with the fact that the HC reaction is about 2.5× more exothermic than the CO reaction means that the TC calorimetric sensor 40b primarily measures HC on the lean side while the COS calorimetric sensor 40a gives a value pretty close to zero.

On the rich side, the calorimeters primarily measure the exothermic reactions of NO and $O_2$ which has passed through close-coupled catalyst 17 with CO, $H_2$ and HC. CO, $H_2$ oxidation with NO (these two reactions have about the same heat release per mole of NO or $O_2$) are expected to dominate the signal owing to faster diffusion and higher concentration than HCs.

The chemical oxidation reactions can be summarized in tabular form as follows:

TABLE

| LEAN SIDE CHEMISTRIES (Limiting Agent is REDUCTANT) | | |
|---|---|---|
| TC Catalyst | HC + $O_2$ | Major Source of Signal |
| | CO + $O_2$ | Very Minor Source of Signal |
| | $H_2$ + $O_2$ | Very Minor Source of Signal |
| COS Catalyst | CO + $O_2$ | Very Small Signal Owing to Low Content CO |
| | $H_2$ + $O_2$ | Very Small Signal Owing to Low Content of $H_2$ |
| RICH SIDE CHEMISTRIES (Limiting Agent is OXIDANT) | | |
| TC Catalyst | NO (or $O_2$) + $H_2$ | $H_2$ Diffuses Quickly to Catalyst Surface |
| | NO (or $O_2$) + CO | CO high concentration + diffuses more quickly than HC |
| | NO (or $O_2$) + HC | If any NO left after the above reactions |
| COS Catalyst | NO (or $O_2$) + $H_2$ | $H_2$ Diffused Quickly to Catalyst Surface |
| | NO (or $O_2$) + CO | Depending on COS Catalyst Activity |

Figure 5:
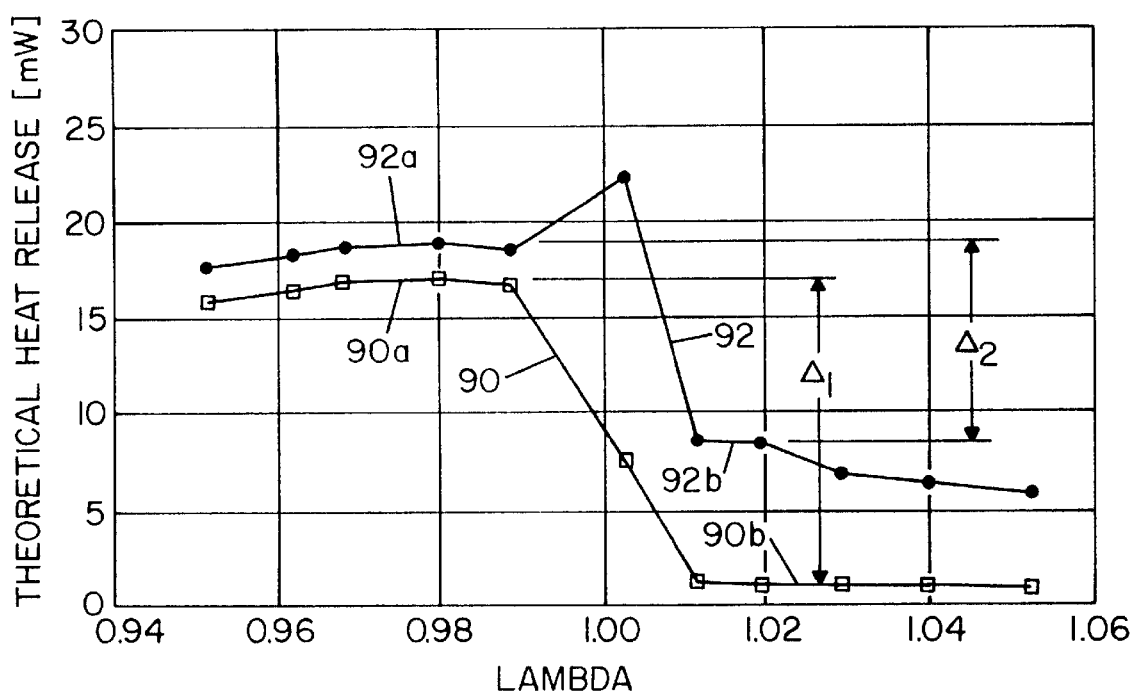

Reference can now be had to FIG. 5 which calculates the exotherm heat release generated for the reactions discussed above for the various lambda conditions illustrated in FIG. 4. Calculations were based on the presence of 200 ppm $O_2$ for the rich conditions illustrated. In FIG. 5, the heat releases or exotherms sensed by COS calorimetric sensor 40a is shown by the graph passing through rectangles and designated by reference numeral 90. The exotherms sensed by TC calorimetric sensor 40b is indicated by the graph passing through the circles and designated by reference numeral 92. Pursuant to the discussion above, that portion of COS curve 90 which is at the rich engine A/F ratio and designated as 90a in FIG. 5 is a measure of the $NO_x$ concentration present in the exhaust gas. That portion of COS curve 90 generated when the engine is operating lean and indicated by reference numeral 90b should in theory be zero. It is not zero because of the presence of secondary or minor exothermic reactions dynamically occurring as discussed above and is referred to as a base line. The difference between baseline 90b and $NO_x$ portion 90a is the delta signal shown as delta, in FIG. 5 and a measure of the $NO_x$ concentration present in the exhaust stream after passing through catalytic converter 17 as determined by COS calorimetric sensor 40a. Similarly, TC curve 92 has a rich portion 92a indicative of $NO_x$ concentration as measured by TC calorimetric sensor 40b. On the lean side of TC curve 92 or the baseline portion thereof 92b, TC calorimetric sensor 40b measures the HC concentration. The delta signal developed by TC calorimetric sensor 40b and shown as delta$_2$ in FIG. 5 is the difference between the $NO_x$ measured at 92a and the HC concentration measured at baseline 92b. It should be noted that COS sensor measures $NO_x$ at 90a and TC sensor measures $NO_x$ at 92a but the curves are not superimposed on one another. This is because the sensors are different and inherently, there will be an offset as shown between curve portions 92a and 90a. For example, the difference can be attributed to different reactivity rates because the catalyst compositions are different and/or they can be attributed to different surface areas or regions 53a, 53b over which the catalysts are deposited since it is impossible to match the areas. The offset as shown in FIG. 5 is relatively constant, and as a practical matter is accounted for during calibration of the sensors.

It is of course appreciated that the operating conditions specified for the preferred embodiment will cycle between specific lambda values, for example, between 0.98 and 1.02. In the invention's simplest form, the delta signals are taken as described. However, the baseline signals 90b, 92b, i.e., the signals, for example, at lambda equal 1.02, will vary.

It must be appreciated that calorimetric sensor 40 measures heat and only a small portion of the heat is attributed to emission producing heat releases. Consider that the exhaust gases are at temperatures of 600° C. and the sensor has to discern that portion of the heat transfer attributed to a specific emission having a concentration of 10 to 20 ppm. The heat transferred by radiation, conduction and/or convection by the exhaust gases to RTD 59 is several orders of magnitude greater than that attributed to that of emission exotherms. For discussion purposes the total heat transferred to calorimetric sensor 40 can be defined as system heat and the small portion of the system heat attributed to emission heat releases can be viewed as a chemical signal arising from exothermic oxidation reactions promoted by the catalyst(s) on the sensor. Because the calorimetric sensor 40 operates in a dynamic environment slight changes in the system heat transfer not attributed to the chemical signal can radically change the reference point at which the emission signal is sensed. This reference point is a "baseline" and it must be appreciated that the baseline is at some very high heat value from which the delta signal is being extracted. Accordingly, it is contemplated that the baseline signals will be (and must be) detrended. Reference can be had to "Applied Numerical Analysis" (Third Edition) by Curtis F. Gerald and Patrick O. Wheatley, Addison-Wesley Publishing Company, 1984 and "Digital Filters and Signal Processing" (Third Edition) by L. B. Jackson, Kluwer Academic Publishers, Boston, 1989 and other conventional works for an explanation of several detrending methods that will be applied to this invention to arrive at a baseline signal from which the delta signal will be generated. (For definitional purposes, the baseline signal is the reference signal obtained at one operating condition which is subtracted from the signal at the other operating condition to produce the delta signal. The baseline signal is chosen to be near zero for the chemical signal to measure certain emission levels in certain embodiments of the invention.)

Figure 5A:
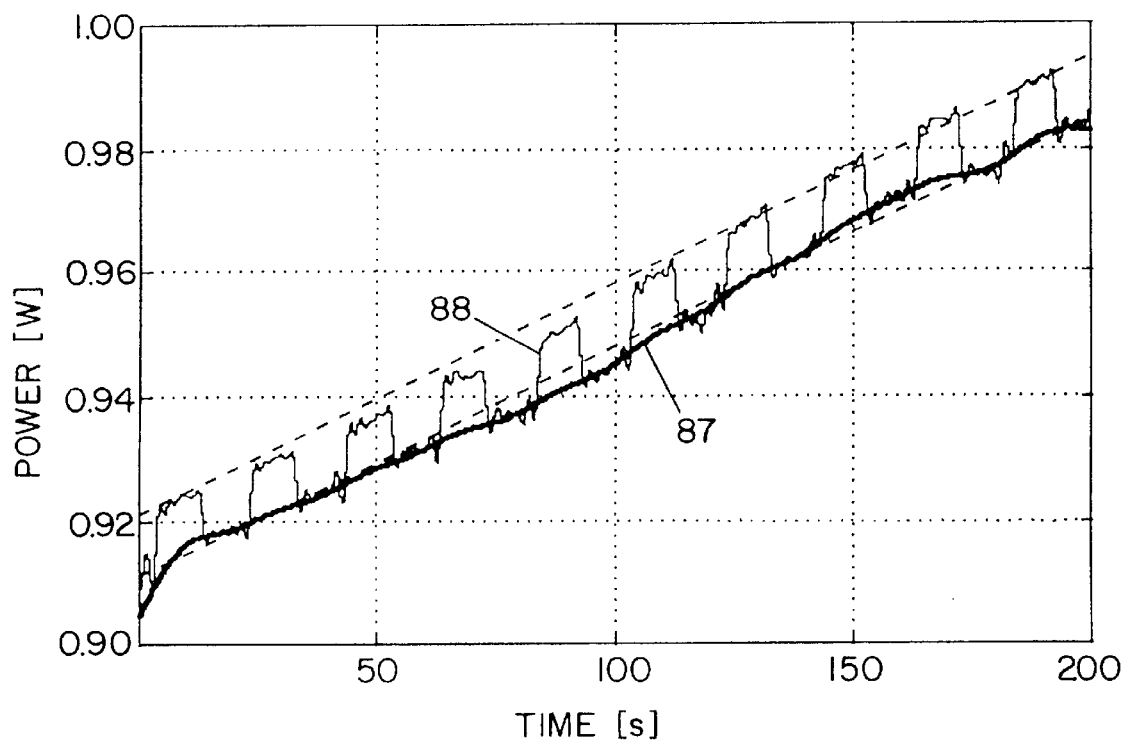
FIG. 5a is a graph similar to FIG. 3c but not detrended.
Figure 5B:
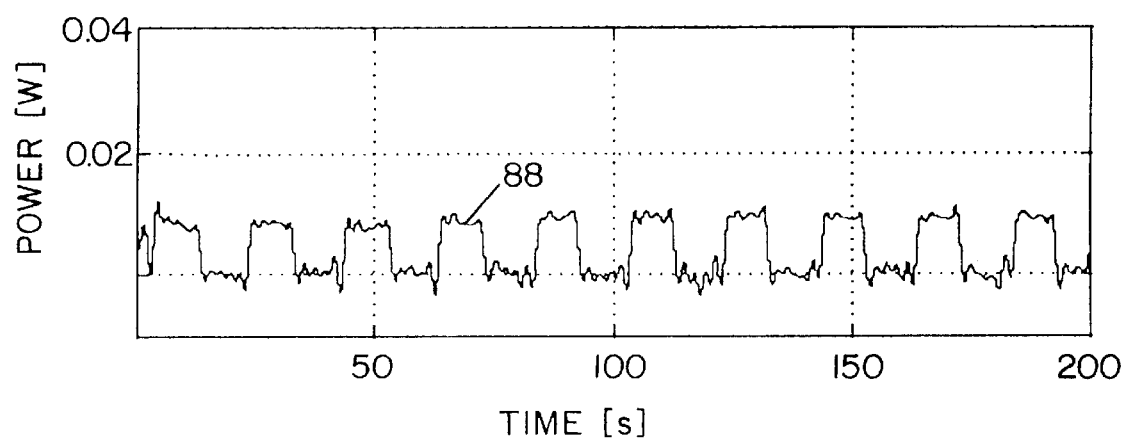
FIG. 5b is the graph of FIG. 5a detrended.

In particular, as the calorimetric signal changes during each cycle from lean to rich, and vise-versa, calorimetric signals can be taken at discrete intervals during each cycle and fitted to a line (slope detection) or a curve (parametric technique, for example) from which a baseline signal at the operating condition can be obtained. It can be readily envisioned that a slight change in system heat transfer not attributed to the chemical signal will shift the curve shown in FIG. 3c (if that curve were not detrended which it is). However, the change in the curve, from wherever it started, would still have the chemical signal rise as shown. This is best shown by reference to FIG. 5a in which the calorimetric sensor power (i.e., temperature) attributed to heat transfer (system heat less heat attributed to the chemical signal) is shown by the line indicated by reference numeral 87 and the chemical signal attributed to emission exotherms is shown by the line indicated by reference numeral 88. The curve fitting techniques discussed permit the change resulting from the chemical signal to be identified and interpolated to a baseline signal from which an appropriate delta signal can be extrapolated. For example, by using a high pass filter, emission exotherm graph 88 of FIG. 5a is detrended as shown in FIG. 5b (or as shown in FIG. 3c). Alternatively, a plurality of signals occurring over a plurality of cycles can be stored and averaged to arrive at an appropriate baseline value from which the delta signal can be obtained. The secondary benefit of utilizing either approach is that drift simply attributed to calorimetric electronics can be automatically detected and adjusted by using either one of the techniques discussed.

In summary of FIG. 5:

A) The TC calorimetric sensor 40b measures $NO_x$-HC concentrations present in the exhaust gas;

B) The COS calorimetric sensor 40a measures $NO_x$ present in the exhaust gas, and C) The difference or delta between the delta signals of the TC calorimetric sensor 40b minus the COS calorimetric sensor 40a measures $[(NO_x-HC)-(NO_x)=]HC$ nonactivity provided that the adjustment between 90a and 92a is made during calibration as discussed.

Another way of stating what is measured is based on limiting reagents. On the rich side, oxidant is the limiting reagent of combustion and the main oxidant is NO. Thus, NO+CO and $NO+H_2$ account for the major portion of the signal. On the lean side, hydrocarbon is the limiting reagent and HC oxidation (with $O_2$ mainly, depending on how lean) is the major portion of the signal. The limiting reductant is HC. As the catalyst ages, the limiting reagent on the lean side remains HC (Note that CO activity on the lean side is good even for aged catalyst) and the sensed heat release will increase. On the rich side, however, catalyst inefficiencies for oxidation increase and $O_2$ becomes a significant contributor as an oxidant. Thus, with both NO and $O_2$ serving to limit heat release on the rich side, the sensed heat release will increase at a rate greater than on the lean side. The net result is an increase in delta power as the catalyst ages.

Figure 6:
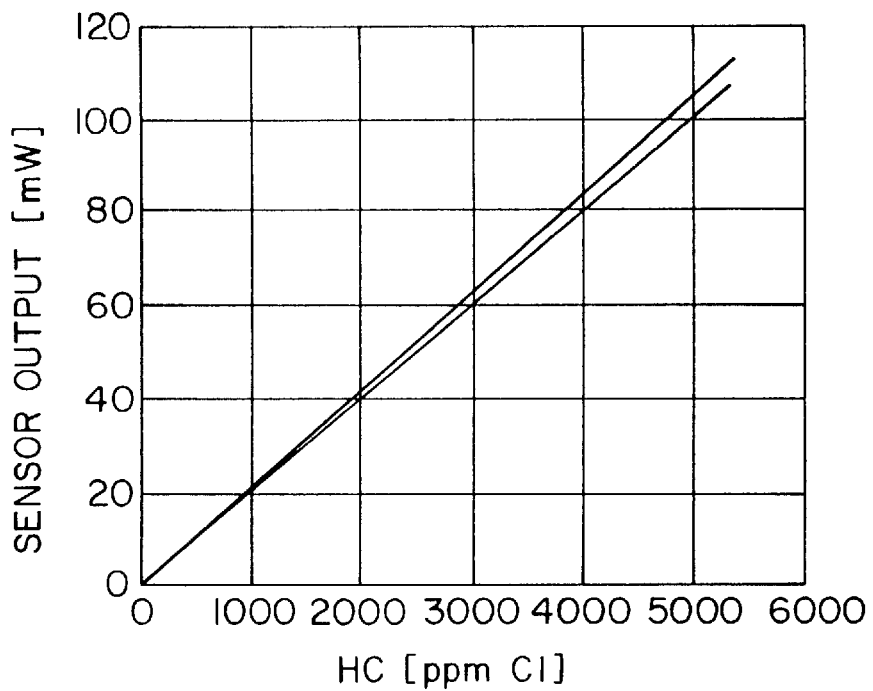
FIG. 6 is a graph of sensor output for various hydrocarbon concentrations with the elements of the sensors shown in FIG. 2 at different orientations within a housing.

Referring now to FIG. 6, the linearity of the sensor output for different hydrocarbon concentrations is shown. The data used to generate the graph depicted in FIG. 6 was obtained by spiking the HC concentration admitted to a lean mixture. The different points at various HC concentrations results from different positions of first and second catalysts 54, 55 within the sensor housing indicating that the sensor is functional irrespective of the position of the catalyst surfaces. FIG. 6 shows that the heat release concepts discussed at length above can be viably and consistently correlated to a sensed concentration of emissions.

Figure 8:
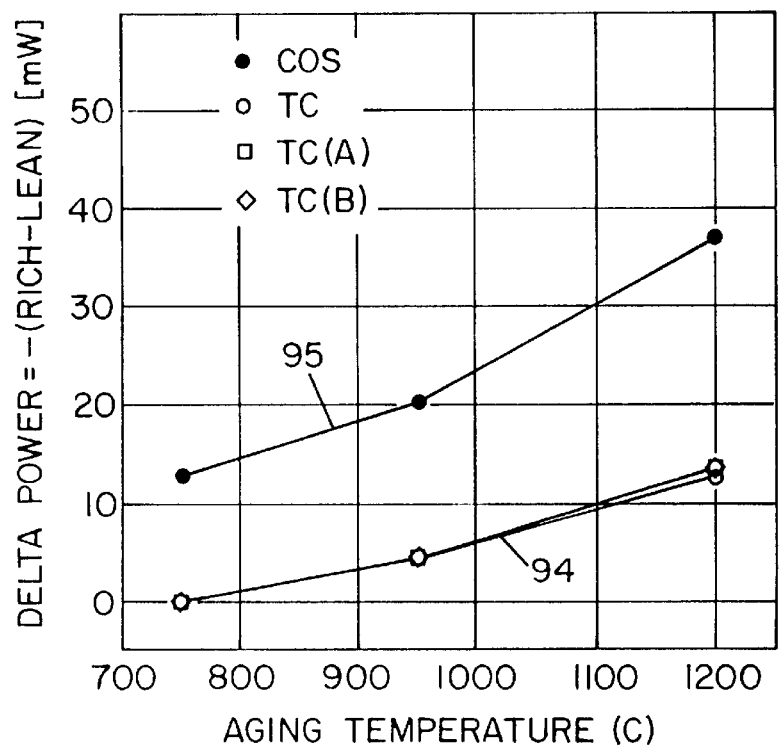
FIG. 8 is a graph of delta signal obtained pursuant to the invention for variously aged catalytic converters.

FIG. 8 shows that the calorimetric sensors used in the present invention systematically (linearly or parametrically) correlate to catalytic converter deterioration. FIG. 8 shows calorimetric sensor delta power outputs determined during lambda cycling in the engine exhaust plotted as a function of exhaust gas catalyst thermal aging temperature. As conventionally known, catalytic converters can be aged to their threshold conversion efficiencies at temperatures of anywhere between 950° C. to 1200° C. FIG. 8 was generated using the lambda cycle discussed with reference to FIGS. 3a, 3b and 3c. Three TC calorimetric sensors 40b were used to determine the linearity of each's response relative to one another and their delta signals are shown by the curve represented by reference numeral 94. The insignificant variation of signals between the three TC calorimetric sensors 40b show an insignificant noise level ($\neq$1 mW) suggesting an improved resolution in sensor output over OSC methods of OBD. The single COS calorimetric sensor 40a delta signal curve indicated by reference numeral 95 closely trends TC output curve 94. As expected, the HC concentration increases as the catalytic converter ages. FIG. 8 shows that the calorimetric sensor can discern different levels of catalyst performance and therefore can be used for the diagnosis of the exhaust gas catalytic converter.

Figure 7:
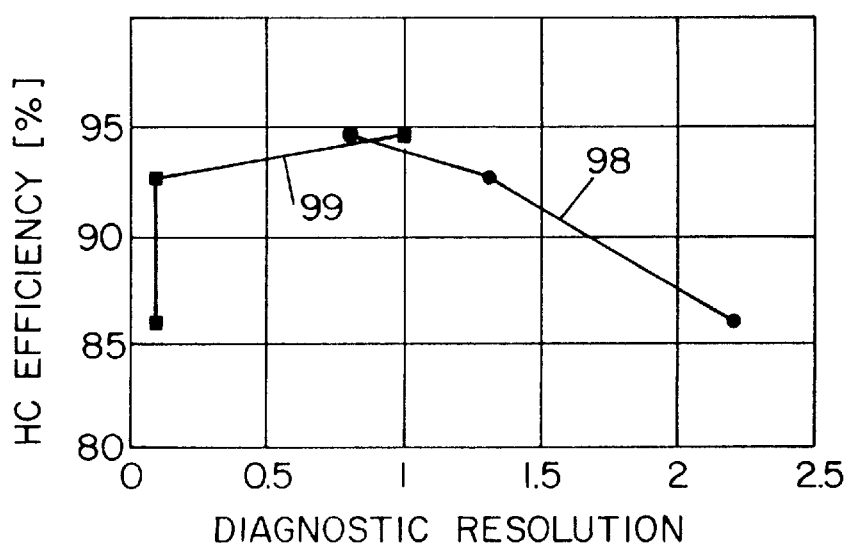
FIG. 7 is a graph of the resolution capabilities of the sensor used in accordance with the present invention compared to a resolution graph for conventional OSC sensors.

In fact, the aging signals shown in FIG. 8 have a significantly improved resolution over conventional dual oxygen sensor techniques which use an OSC method and this is shown by reference to FIG. 7. In FIG. 7, the diagnostic resolution of calorimetric sensors using the system of the present invention is shown by the curve passing through circles indicated by reference numeral 98. Catalytic deterioration signal resolution using conventional EGO sensors is indicated by the curve passing through lines connected by squares and indicated by reference numeral 99. The ability of the invention to determine catalyst or catalyst deterioration from aging when the efficiency of the catalytic converter drops to values below 90% is clearly shown by FIG. 7 to be significant and represents a marked improvement in the OBD monitoring system art.

D) System Refinement and Extensions

Figure 9A:
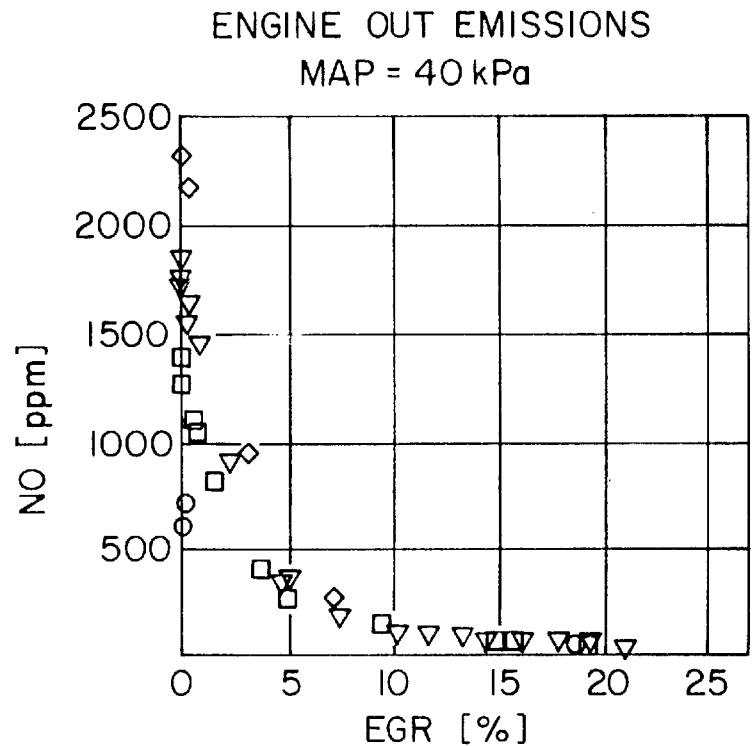
FIG. 9a is a plot of nitrous oxide emissions occurring at various engine operating speeds as a function of the percentage of exhaust gas recirculated to the engine.
Figure 9B:
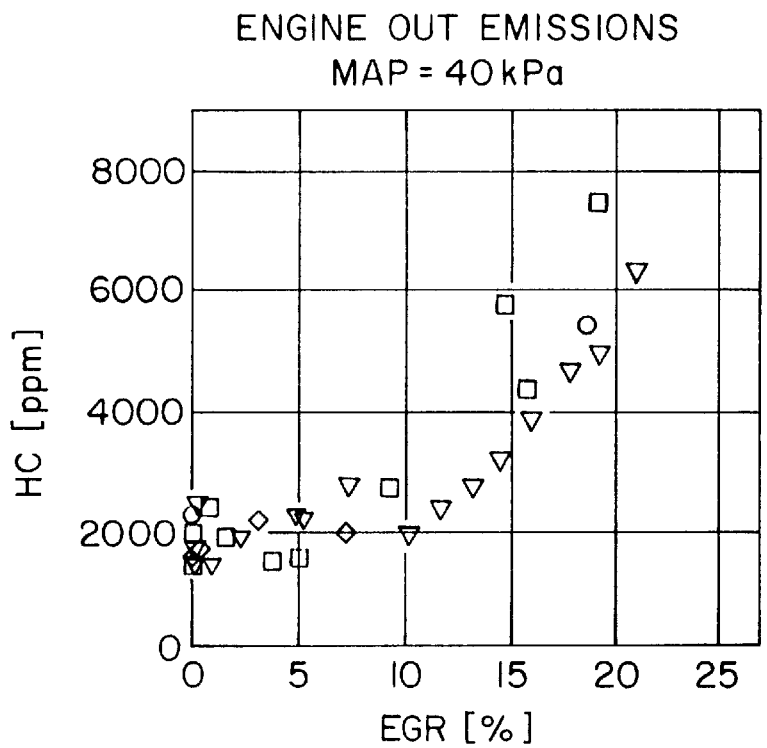
FIG. 9b is a plot similar to FIG. 9a but showing hydrocarbon emissions as a function of various EGR percentages for engine speeds.

Referring now to FIGS. 9a and 9b, there is shown a further refinement of the inventive system. FIGS. 9a and 9b show the effect EGR has on reducing the engine out $NO_x$. FIG. 9a is a plot of engine operating points indicating concentration of NO at various EGR levels. Round points were taken at engine speed of 1500 rpm; square points were measured at 2500 rpm; triangular points indicate $NO_x$ concentration at 3500 rpm; and diamond points indicate $NO_x$ concentration at 4000 rpm. FIG. 9b is a plot of points similar to that of FIG. 9a but showing various concentrations of HC as a function of EGR percentage. EGR percentage means that portion of the exhaust gas which is recirculated back and mixed with combustion air for induction with fuel into the combustion chambers of the engine. FIG. 9a clearly shows that increasing EGR percentages decreases $NO_x$ engine out emissions. While this correlation may admittedly be well understood in the art, it is somewhat surprising that when FIG. 9a is compared to FIG. 9b, it can be clearly seen that the HC emissions which remain fairly constant do not increase until after most of the $NO_x$ reduction has occurred. More specifically, when the EGR percentage is increased to the ten percent level shown, the $NO_x$ concentration level has dropped by an order of magnitude while the HC level has remained nearly constant. At this point, the $NO/CO/H_2$ rich exothermic reactions have been reduced to a point where the measurement on the calorimeter during the rich cycle is primarily due to any unreacted $O_2$ in the rich-post catalyst exhaust stream. As a result, the rich side signal of a calorimetric sensor will decrease significantly.

Figure 10:
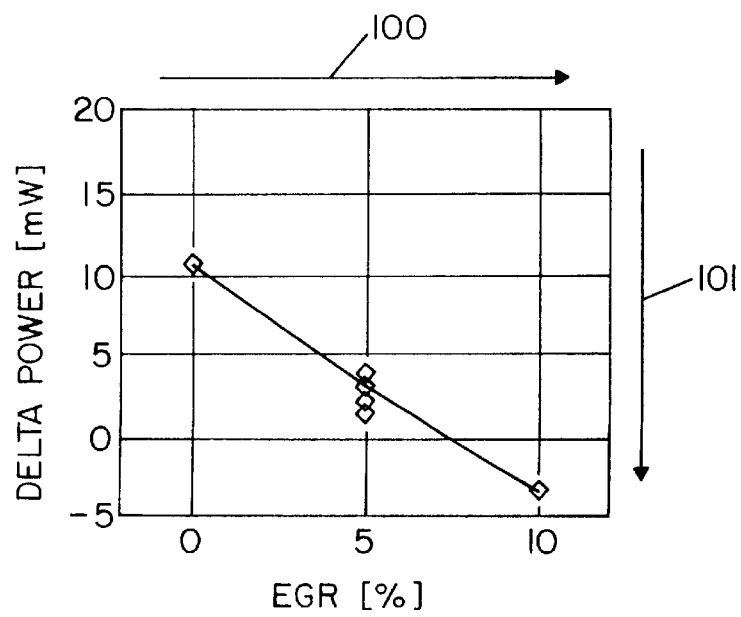
FIG. 10 is a graph based on the engine testing of FIGS. 9*a* and 9*b* showing the changes to the delta signal of the present invention as a function of percentage of exhaust gas recirculated to the engine.

The correlation based on the trends observed in FIGS. 9a and 9b is shown in FIG. 10 when applied to the invention. As the EGR is increased as indicated by the arrow designated by reference numeral 100, the output of the TC sensor (rich–lean) signal is decreased as shown by the arrow indicated by reference numeral 101. It should be noted in this regard that the $O_2$ level when rich should be at a much smaller level than when lean because even an aged catalyst has good conversion of CO and $H_2$ with any $O_2$ present. Therefore, if the operating condition of the vehicle is varied with lambda as described in the preferred embodiment and, in addition, the EGR is fixed at a set percentage, i.e., ten percent, throughout the cycle, then the curve shown as 92 for the TC sensor in FIG. 5 will flip-flop. More particularly, curve portion 92a for TC calorimetric sensor 40b will decrease to an insignificant value in the nature of curve portion 90b for COS calorimetric sensor 40a. Curve portion 92a will become the baseline portion for the $delta_2$ signal and the $delta_2$ signal will now measure directly the HC concentration. Thus a single TC calorimetric sensor, 40b, can directly measure HC concentration in the post catalytic converter exhaust stream.

This alternative embodiment illustrates that the intrusive operating condition imposed on the engine can function with mere lambda cycling or can function with lambda cycling at a set condition, such as EGR at a set limit. In both embodiments, the engine is operated at conditions which produce gaseous emissions having concentrations producing heat releases relatively sensed by calorimetric sensor(s) directly correlated to regulated emissions.

Figure 11:
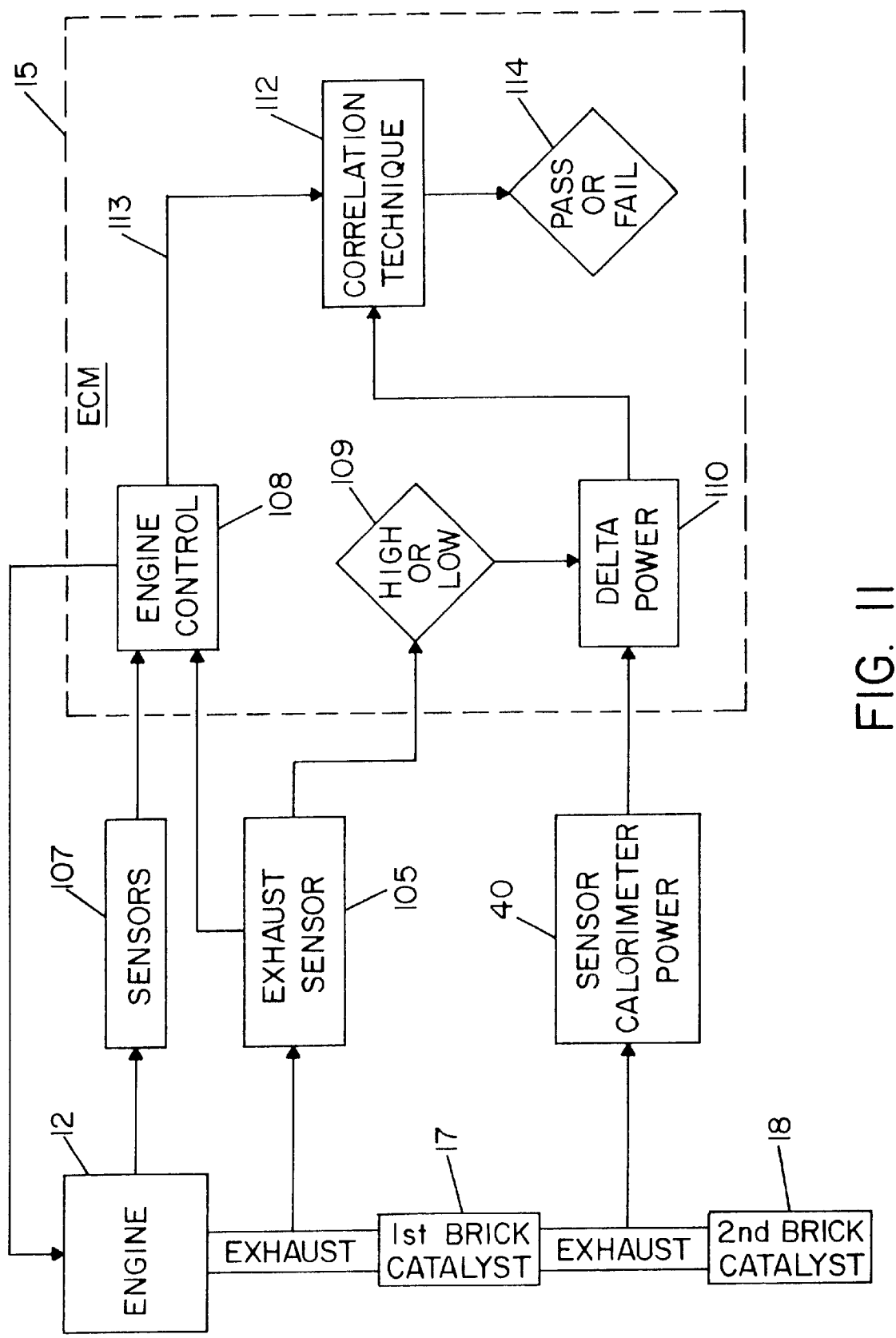
FIG. 11 is a flow chart illustrating generally the inventive process of the present invention; and, FIG. 12 is a flow chart similar to FIG. 11 but detailing a very simple application of the invention.

Referring now to FIG. 11 there is shown a general flow chart of the system of the present invention. In general terms, an exhaust sensor 105 of any type downstream of engine 12 but upstream of close-coupled catalyst 17 makes a general determination of some component in the exhaust gas, i.e., oxygen, sufficient to indicate that the engine is periodically cycling at some frequency. The signal from exhaust sensor 105 along with signals from other sensors 107 measuring other operating conditions of engine 12 is inputted to an engine control 108 in ECM 15 to intrusively cause engine 12 to operate at first and second operating conditions which are described in the preferred embodiment as rich or lean but do not affect driveability or even tailpipe emissions to the extent that they are not in compliance with government regulations after passing through the catalytic converters. Exhaust sensor signal is also sent to a condition determination block 109 which determines when the engine is at its high or low points (rich or lean) in the cycle imposed by engine control 108 vis-a-vis exhaust sensor readings 105. Additionally, condition sensing block 109 can set the timing increments within each period for detrending such as by the use of slope line algorithms, etc. Operating condition signal from block 109 and calorimetric sensor signals from block 40 are then subtracted or otherwise factored to produce the delta signal in delta power block 110. The delta signal is then correlated to catalytic converter efficiency in correlation block 112 which also requires that the vehicle is operating at the appropriate conditions (if any) by a signal from engine control 108 shown as reference numeral 113. Correlation block 112 then determines whether or not the efficiency of the catalytic converter has changed to the point where a fault code must be initiated at pass/fail block 114 and, in turn, activate display 29.

Figure 12:
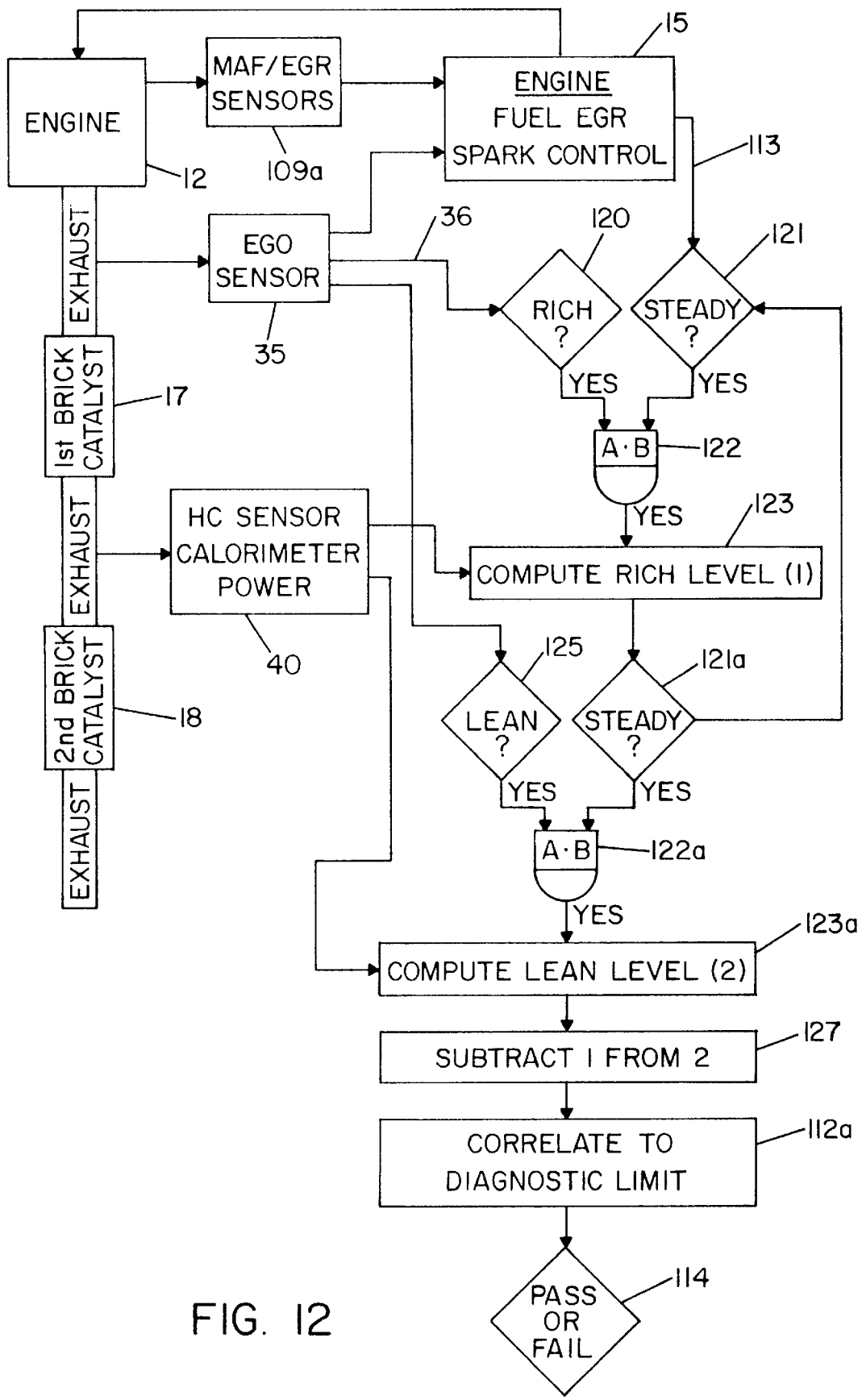

A simple flow chart based on the preferred embodiment operating cycle disclosed in FIG. 3c is shown in FIG. 12. EGO sensor signals 35 are inputted into ECM 15 along with other sensor signals from operating condition block 109a which, in turn, causes the periodic cycling of engine 12. In the preferred embodiment, the mass air flow (line 39 in FIG. 1) is used by ECM 15 along with EGO sensor (signal line 36 in FIG. 2) to set the lambda cycling as specified in FIG. 3a. In the alternative embodiment, additionally, an EGR signal (signal line 33 in FIG. 1) is additionally inputted to ECM to control the exhaust gas recirculation percentage if the system of the alternative embodiment is utilized. Also, ECM 15 generates a signal on line 113 indicative of whether or not engine 12 is at steady state conditions and this could be determined, for example, from speed sensor signal 32 (FIG. 1). EGO sensor signal line output 36 is inputted to a rich determination block 120 in which it is determined whether or not the operating condition cycle has reached its rich amplitude level. If it has, a "yes" signal is inputted to And gate 122. In addition, steady state block 121 determines whether or not the engine is operated at steady state conditions, for example, constant speed. If both signals are "yes", then And gate 122 triggers a computation at block 123 which receives the delta power signal inputted to calorimetric sensor 40 at that time. This computes the sensor signal at the rich operating condition of the cycle which is then checked against the second steady state condition block 121a and so long as steady state conditions are present, the signal is inputted as a yes signal to second And gate 122a. EGO sensor 35 also sends its signal to lean determination block 125 which outputs a "yes" signal to And gate 122a at the time EGO sensor 35 senses he oxygen content of the precatalytic exhaust stream to be at the leanest mixture in the lambda cycle. If steady state condition is still present, second And gate 122a triggers second computation block 123a to compute the calorimetric sensor signal at that time. The rich calorimetric signal is subtracted from the lean calorimetric signal in block 127 and correlated to hydrocarbon efficiency in block 112a to determine a pass/fail condition at block 114.

In the preferred embodiment and in the alternative embodiment, the intrusive monitoring system of the invention cyclically varied lambda. It was mentioned that lambda could be set at any lambda bias and lambda amplitude could be set at various values (and not necessarily equal) about lambda bias. In addition, the period or frequency of the cycling was set at about 5 seconds in the preferred embodiment but the A/F perturbation frequency could have different times. It should be clear that ECM 15 can use other operating conditions of engine 12 to establish a cycle between which exhaust gas chemistries change to enable the system of the present invention to function. Such conditions include but are not necessarily limited to engine timing and engine timing can mean either valve timing, fuel timing or spark timing. With respect to engine timing, it is relatively clear that spark timing can be advanced or retarded to effect engine exhaust gas compositions. Alternatively, the percentage of the EGR gas recirculated back to the engine combustion chambers can simply be cyclically varied between various limits. For example, FIGS. 9a and 9b clearly show that at one EGR percentage NO is minimal but at a lesser EGR percentage, a significant quantity of NO is generated. Accordingly, the operating conditions of the cycle can be established by simply cycling the EGR system. In addition, while lambda cycling can be varied to be set at any number of frequencies, simply varying the rate of A/F perturbations can, in itself, establish the different exhaust gas chemistries sensed by the system of the invention. For example, if the perturbations are increased to high frequencies of 10 Hz, the signal generated will not make any distinctions between variations in a cycle but will nevertheless establish a chemistry at that condition which can then be analyzed when the A/F perturbations are slowed. Thus, a fast cycle for a given period of time establishes the first operating condition and a slow cycle for a given period of time establishes the second operating condition and the engine cycles between fast cycles and slow cycles. Operating conditions can be established for any and all engine operating parameters.

In addition, it must also be noted that the exhaust gas chemistries can change depending on the catalyst selected for close coupled catalyst 17. For example, a Rhodium based catalyst can produce conditions similar to that obtained by setting the EGR percentage, i.e., 10%. $NO_x$ can be substantially eliminated and a direct measure of post catalytic converter HC obtained with lambda cycling.

As is known, OBD (and as used herein, OBD means, OBD, OBD-II, etc.) require that the monitoring system determines which component or part of the emission system resulted in the vehicle's failure to meet emission standards. It is conceivably possible, even with the engine at steady state conditions as shown in the flow chart of FIG. 12, for a calorimetric sensor to generate a failed signal, when in fact catalytic converter 17 has not failed due to a failure in another system component.

Accordingly, the system of the present invention contemplates that in the event a failure is indicated at fail pass block 114, a second series of stress cycles will be monitored to verify that the fail signal in block 114 is a true failure. While the invention has been described as if a single signal was causing a pass/fail signal (and in its simplest form, this is exactly how the invention works), in practice, a plurality of sensor signals are obtained for the plurality of operating condition cycles which occurred during the time the system was monitoring the efficiency of the catalytic converter. As already discussed, the intrusive technique is employed only when certain operating conditions of the vehicle are present, for example steady state, to insure the desired emission concentrations at which the chemistries will be measured.

As already discussed, each signal is preferably detrended, to establish a baseline for the relative delta signal, or alternatively, a plurality of the signals can be detrended to establish a baseline for the delta measurements. In addition, the signals are filtered by any conventional band pass technique to avoid sporadic signals causing a failure detection such as signals resulting from misfire or a sudden calamitous failure of the entire system, such as might occur if another system failed causing failure of a properly functioning catalytic converter. Such filtering techniques will avoid reporting erroneous failures for isolated or calamity failures. In addition, the filtering techniques reduce noise.

Apart from this, when the filtered signal indicates a failure, the system selects another operating condition cycle which is more stressful to the catalytic converter than that under which the catalytic converter is initially chosen. The system runs at the stressed condition cycle to generate delta signals which are compared or correlated to different stored conversion efficiency values to determine if the catalytic conversion efficiency has dropped below an acceptable level. If the stressed signals also indicate failure, then display light 29 is actuated and the failure code stored in memory.

As discussed above, there are three factors which control the ability of the catalytic converter to process emissions, namely, the A/F ratio, which determines the emission concentrations in the first place, the space velocity of the emissions and the temperature of the emissions. Any one of these parameters can be varied to produce a more stressful cycling condition. The A/F ratio has been discussed at length with respect to a preferred embodiment. Multiple intrusion techniques can be used when various operating conditions of the vehicle are detected or observed which affect space velocity or temperature, and the observed condition used to conduct the stress cycle.

The invention has been described with reference to a preferred embodiment and alternative embodiments. Modifications and alterations will suggest themselves to those skilled in the art upon reading and understanding the Detailed Description of the Invention set forth herein. For example, the system is an intrusive monitoring system. However, observation methods and techniques could nevertheless be employed to simply store and statistically factor the signals produced at the operating conditions to determine whether or not the vehicle meets emission standards without reference to catalytic efficiencies. Different operating conditions can be set for cycling the engine other than those described herein. In addition, catalytic converter arrangements can be serially employed to generate selective exhaust gas concentrations which can be cyclically measured. It is intended to include all such modifications and alterations insofar as they come within the scope of the present invention.

Having thus defined the invention, it is claimed:

1. An on-board diagnostic method for determining if the emissions of an internal combustion engine in a vehicle with a catalytic converter comply with regulatory standards comprising the steps of:
- a) providing a calorimetric sensor downstream of said catalytic converter developing electrical sensor signals indicative of the concentration of at least one, specific regulated gaseous emission in the vehicle's exhaust gases;
- b) cyclically operating said engine between a first operating condition producing exhaust gases having a first composition of gaseous emissions and a second operating condition producing exhaust gases having a second, composition of gaseous emissions with different concentrations of specific emissions than said first mixture;
- c) determining a delta signal indicative of the difference between said calorimetric signals generated for said first and second gas mixtures in any given cycle; and,
- d) comparing said delta signal to a stored value correlated to the efficiency of said catalytic converter to convert said specific gaseous emissions to harmless gaseous emissions to satisfy said regulatory standards whereby a relative sensor signal, independent of an absolute value, senses concentrations of specific regulated gaseous emissions to determine compliance with said regulatory standards.

2. The method of claim 1 wherein said operating condition is lambda, defined as the combustion air to fuel ratio supplied to the combustion chambers of the engine divided by the combustion air to fuel ratio supplied to said chambers to produce stoichiometric combustion.

3. The method of claim 2 wherein lambda is varied at a set frequency causing said operating conditions to cyclically occur at said set frequency.

4. The method of claim 2 wherein lambda is set at a fixed number establishing a lambda bias and cyclically varied from said lambda bias between a set higher and a set lower number to cause said operating conditions to cyclically occur.

5. The method of claim 4 wherein said variation from said lambda bias establishes lambda amplitude, said lambda amplitude fixed at a set value.

6. The method of claim 2 wherein said first operating condition is defined as a lean condition in which lambda is greater than one and said second condition is defined as a rich condition in which lambda is less than one.

7. The method of claim 2 wherein said first operating condition is defined as a lean condition in which lambda is greater than one by a set amount and said second operating condition is defined as a more lean condition in which lambda is greater than one by a second set amount, said second set amount greater than said first set amount.

8. The method of claim 2 wherein said first operating condition is defined as a rich condition in which lambda is less than one by a first set fractional amount and said second operating condition is defined as a more rich condition in which lambda is less than one by a second set fractional amount, said second set fractional amount greater than said first fractional amount.

9. The method of claim 2 wherein the time of said cycle does not exceed more than about five seconds, and lambda is not less than 0.98 in said first condition and not more than about 1.02 in said second condition whereby said vehicle may be driven in a fuel efficient manner without adversely affecting vehicular driveability and/or tail pipe emission while said monitoring method is active.

10. The method of claim 1 wherein said specific gaseous emission is one or more emissions selected from the group consisting of hydrocarbons, carbon monoxide, $NO_x$ and hydrogen within the exhaust stream.

11. The method of claim 1 wherein said sensor's electrical signal is proportional to the exothermic oxidation reactions of the gaseous emissions sensed by said sensor; said operating conditions being selected such that at one of said operating conditions at least one specific gaseous emission is caused to be present at minimal concentration levels producing exothermic oxidation reactions which cause said sensor's electrical signal generated at said one operating condition to approximate a baseline value while said specific emission is present at a higher concentration at the other one of said operating conditions to produce an exothermic oxidation reaction causing said sensor's electrical signal to exceed said baseline value and thus constitute at least a portion of said delta signal and a measure of catalyst efficiency for said specific emission.

12. The method of claim 11 wherein said baseline value is approximately zero and said minimal concentration of said specific emission is insignificant.

13. The method of claim 11 further including the steps of accumulating a plurality of said sensor's electrical signals for a plurality of cycles produced at said operating condition whereat said specific emission concentration level is at minimal concentration levels and detrending said data at said condition producing minimal concentrations whereby said baseline is established, said delta signal being the difference between said baseline and said signals produced at the other one of said operating conditions.

14. The method of claim 11 wherein said step of detrending includes the steps of fitting the data to a linear line and calculating the slope of said line to define said baseline.

15. The method of claim 11 further including the additional steps of a) performing a first plurality of cycles to generate a first plurality of normal delta signals until one or more normal delta signals indicate a failure of said catalytic converter; b) additionally varying one or more parameters selected from the group consisting of i) space velocity of said exhaust gases, ii) the temperature of said exhaust gas sensed by said sensor and iii) air/fuel ratio and/or cycling thereof by a set amount from the value said parameter had during the time said first plurality of delta signals were collected; c) performing a second plurality of operating condition cycles with said selected parameter present to generate a second plurality of stressed delta signals and d) comparing said stressed delta signals to a second threshold to determine if said normal delta signals are valid so that a failure established by said normal delta signals is attributed to a failure of the catalytic converter.

16. The method of claim 15 wherein said selected parameter is caused to cyclically change while said second plurality of delta signals are generated.

17. The method of claim 15 wherein said parameter is temperature, said method further including the step of changing the power inputted to the heater of said sensor during the time said stressed delta signals are generated so that the temperature of said exhaust gases sensed by said sensor is increased.

18. The method of claim 15 wherein said parameter is space velocity of said exhaust gas and said method further includes the additional step of changing one or more of said engine's operating conditions selected from the group consisting of i) mass combustion air flow; ii) manifold air pressure; and, iii) engine operating speed from the value said selected condition had during the time said first plurality of signals were generated.

19. The method of claim 15 wherein said parameter is said A/F ratio, said method further including the step of changing said A/F ratio and/or period during the time said stressed delta signals are obtained to values different than that present during the initial time period during which said normal delta signals were generated.

20. The method of claim 11 wherein one of said operating conditions is selected so that the principal limiting reagent producing said reaction detected by said calorimetric sensor is a reductant at one of said operating conditions while the principal limiting reagent producing said reaction detected by said calorimetric sensor at the other operating condition is an oxidant.

21. The method of claim 20 wherein said reductant is HC and said oxidant is $O_2$ and NO.

22. The method of claim 11 wherein said sensor has a catalyst surface promoting CO and/or $H_2$ exothermic oxidation reactions with exhaust gases passing over said surface; said first operating condition causing said engine to operate at a lean air/fuel ratio such that CO is substantially not present in said exhaust gas at said sensor; and said second operating condition causing said engine to operate at a rich air/fuel ratio such that the exothermic reaction of CO and/or $H_2$ with NO changes said electrical signal from said first operating condition to produce said delta signal indicative of the concentration of $NO_x$ emissions at said second operating condition.

23. The method of claim 11 wherein said sensor has a catalyst surface promoting exothermic oxidation reactions with HC, NO, CO and $H_2$ emissions contained in said exhaust gas passing over said catalyst surface; said first operating condition causing said engine to operate at a lean air/fuel ratio such that CO and $H_2$ is substantially not present in said exhaust gas at said sensor while said catalyst promotes exothermic oxidation reactions with HC whereby said electrical signal generated by said sensor is indicative of the HC concentrations in the exhaust gas at said first operating condition and said second operating condition causing said engine to operate at a rich air/fuel ratio such that CO and $H_2$ exothermic oxidation reactions with NO principally causes a heat release sensed by sensor whereby said electrical signal generated by said sensor at said second condition is indicative of the $NO_x$ concentration in said exhaust gas.

24. The method of claim 23 further including the steps of providing a second sensor having a second catalyst surface promoting CO and/or $H_2$ exothermic oxidation reactions with exhaust gases passing over said second surface; said second sensor signal substantially unaffected by HC when said engine is operating in said lean first condition and producing an electrical signal indicative of $NO_x$ resulting from the exothermic oxidation reaction of CO and/or $H_2$ with NO at said second operating condition whereby said second sensor produces a second delta signal indicative of $NO_x$ concentration in said exhaust gas, and subtracting said second delta signal from said first delta signal to produce a signal indicative of the concentration of HC in said exhaust gas.

25. The method of claim 24 further including the step of providing said second catalyst surface area and said first catalyst surface area in one sensor housing whereby the same exhaust stream passes over both said first and second catalyst areas.

26. The method of claim 1 further including the steps of storing and detrending said signals occurring at one of said operating conditions for a set number of cycles to determine a baseline signal for said one of said operating conditions, said baseline signal subtracted from said sensor signal at the other one of said operating conditions to produce said delta signal.

27. The method of claim 11 wherein said sensor has a catalyst surface promoting exothermic oxidation reactions for HC, CO, NO and $H_2$ emissions; said vehicle has an exhaust gas recirculation system for metering a portion of said exhaust gas with combustion air injected with fuel into the combustion chambers of said vehicle; said method further including the steps of regulating the vehicle's exhaust gas recirculation system to inject a set percentage of exhaust gas into said combustion chambers; said first operating condition causing said engine to operate at a lean air/fuel ratio such that CO and $H_2$ is substantially not present at said sensor while said catalyst surface area promotes exothermic oxidation reactions with said HC causing said sensor's electrical signal to be indicative of said HC concentration in said exhaust gas at said first operating condition and said second operating condition causing said air/fuel ratio to operate at a rich condition whereat substantially insignificant exothermic oxidation reactions occur with said gaseous emissions whereby said delta signal is indicative of the HC concentration in said exhaust gas.

28. The method of claim 27 wherein said set percentage of exhaust gas recirculated to said combustion chambers is about ten percent.

29. The method of claim 1 wherein said operating condition is timing of said engine, said first operating condition being selected at one timing condition and said second operating condition being selected at a second advanced timing condition.

30. The method of claim 29 wherein said timing operating condition is selected from the group consisting of i) spark timing; ii) valve timing; and iii) injection timing.

31. The method of claim 30 wherein said operating condition is spark timing, said timing being advanced in said first operating condition and retarded in said second operating condition.

32. The method of claim 1 wherein said vehicle has an exhaust gas recirculation system for metering exhaust gas with combustion air injected with fuel into the combustion chambers of said engine, said first operating condition occurring when a set percentage of exhaust gas is metered into said combustion chamber and said second operating condition occurring when a different set percentage of exhaust gas is metered into said combustion chamber.

33. The method of claim 1 wherein said method is operative only for a set time period during steady state conditions of a drive cycle of said vehicle whereby said vehicle may operate at rapid air to fuel perturbations during other modes of operations.

34. The method of claim 1 further including the step of filtering said delta signal before comparing said delta signal to said stored value to ascertain that said delta signal is a valid signal for comparison.

35. An on-board monitoring system for detecting a failure of the catalytic converter in the exhaust system of a vehicle equipped with an internal combustion engine to control concentrations of certain gaseous emissions of said vehicle within regulatory standards, said system comprising:

a calorimetric sensor downstream of said catalytic converter for generating, when activated, electrical sensor signals indicative of at least one regulated gaseous emission in said vehicle's exhaust gas;

means for cyclically operating said engine between a first operating condition producing a first exhaust gas composition of gaseous emissions within a first range of concentrations and a second operating condition producing a composition of gaseous emissions within a second range of concentrations, said first and second emissions concentration ranges being different from one another to produce different heat releases resulting from exothermic oxidation reactions of certain gaseous emissions sensed by said calorimetric sensor;

means for generating a delta signal resulting from the difference between said calorimetric sensor signals of said first composition and said second composition sensed in the same cycle;

means for comparing said delta signal to a stored signal, said stored signal correlated to said first and second operating conditions for determining the efficiency of said catalyst converter to convert said at least one regulated sensed emission to harmless emissions without reference to a specific value assigned the sensor signal at any specific condition; and, means for actuating an alarm indicator should said stored value be exceeded.

36. The system of claim 35 wherein said means for cyclically operating said engine includes an air to fuel regulating means regulating the ratio of the amount of combustion air and the amount of fuel supplied to the engine's combustion chambers.

37. The system of claim 36 wherein said at least one gaseous emission being sensed are hydrocarbons, said means for cyclically operating further including means for controlling the amount of said exhaust gas being recirculated to said combustion chambers by a set amount whereby emissions forming $NO_x$ are significantly reduced in one of said compositions to minimize exothermic oxidation reactions for that composition and produce a near zero sensor signal at one of said operating conditions while the other operating condition produces HC exothermic oxidant reactions resulting in a delta signal indicative of HC concentration in said exhaust gas.

38. The system of claim 35 wherein said means for cyclically operating includes means for varying the timing of said engine.

39. The system of claim 35 further including means for introducing a portion of said exhaust gases with combustion air metered with fuel into the combustion chambers of said engine and wherein said means for cyclically operating said engine including cyclically varying the amount of exhaust gases metered with said combustion air into said combustion chambers from a first set percentage to a second set percentage.

40. The system of claim 35 wherein said means for comparing includes means for storing and detrending said signals occurring at one of said operating conditions for a set number of cycles to determine a baseline signal for said one of said operating conditions, said baseline signal subtracted from said sensor signal at the other one of said operating conditions to produce said delta signal.

41. The system of claim 35 wherein said means for cyclically operating said engine establishes a set operating cycle having a period of about five seconds.

42. The system of claim 35 further including means for verifying that said engine is operating at one or more set values selected from the group consisting of i) exhaust gas temperature, ii) exhaust gas volume flow, iii) engine timing; and, iv) mass air flow and/or pressure, before said means for cyclically operating said vehicle occurs.

43. The system of claim 35 wherein said catalytic converter includes a close-coupled catalyst spaced closely adjacent said engine and having a washcoat substantially lacking ceria, said catalytic converter effective to reduce HC concentrations in said exhaust gas.

44. The system of claim 35 wherein said operating condition is lambda, said lambda being the combustion air to fuel ratio supplied to the combustion chambers of the engine divided by the combustion air to fuel ratio supplied to said chambers to produce stoichiometric combustion.

45. The system of claim 44 wherein said means for cyclically operating causes said lambda to be varied at a set frequency whereby said operating conditions cyclically occur at said set frequency.

46. The system of claim 44 wherein said means for cyclically operating causes said lambda to be set at a fixed number establishing a lambda bias and cyclically varied from said lambda bias between a set higher and a set lower number whereby said operating conditions cyclically occur.

47. The system of claim 46 wherein said variation from said lambda bias establishes a lambda amplitude, said lambda amplitude being at a set value.

48. The system of claim 35 wherein said sensor's electrical signal being proportional to the exothermic oxidation reactions of the gaseous emissions sensed by said sensor; said means for cyclically operating causing said operating conditions to be selected such that at one of said operating conditions at least one specific gaseous emission is caused to be present at minimal concentration levels producing exothermic oxidation reactions which cause said sensor's electrical signal generated at said one operating condition to approximate a baseline value while said specific emission is present at a higher concentration at the other one of said operating conditions to produce an exothermic oxidation reaction causing said sensor's electrical signal to exceed said baseline value and thus constitute at least a portion of said delta signal and a measure of catalyst efficiency for said specific emission.

49. The system of claim 48 wherein said baseline value being approximately zero and said minimal concentration of said specific emission being insignificant.

50. The system of claim 48 further including means for accumulating a plurality of said sensor's electrical signals for a plurality of cycles produced at said operating condition whereat said specific emission concentration level is at minimal concentration levels and means for detrending said data at said condition producing said minimal concentrations whereby said baseline is established, said delta signal being the difference between said baseline and said signals produced at the other one of said operating conditions.

51. The system of claim 50 wherein said means for detrending includes the means for fitting the data to a linear line and calculating the slope of said line to define said baseline.

52. The system of claim 48 wherein said means for cycling producing a first plurality of cycles generating a first plurality of normal delta signals until said means for comparing indicates that one or more normal delta signals exceeded said stored value, said system further including means for; b) additionally varying one or more parameters selected from the group consisting of i) space velocity of said exhaust gases, ii) the temperature of said exhaust gas sensed by said sensor and iii) air/fuel ratio and/or cycling thereof by a set amount from the value said parameter had during the time said first plurality of delta signals were collected; means for additionally producing a second plurality of operating condition cycles with said selected parameter present to generate a second plurality of stressed delta signals; said comparing means additionally comparing said stressed delta signals to a second threshold to determine if said normal delta signals are valid, said actuating means activated when a stressed signal exceeds said second threshold.

53. The system of claim 52 wherein said selected parameter being cyclically change while said second plurality of delta signals are generated.

54. The system of claim 52 wherein said parameter being temperature, said system further including means for changing the power inputted to the heater of said sensor during the time said stressed delta signals are generated so that the temperature of said exhaust gases sensed by said sensor is increased.

55. The system of claim 52 wherein said parameter being space velocity of said exhaust gas and said system further includes means for changing one or more of said engine's operating conditions selected from the group consisting of i) mass combustion air flow; ii) manifold air pressure; and, iii) engine operating speed from the value said selected condition had during the time said first plurality of signals were generated.

56. The system of claim 52 wherein said parameter being A/F ratio, said system further including means for changing said A/F ratio and/or period during the time said stressed delta signals are obtained to values different than that present during the initial time period during which said normal delta signals were generated.

57. The system of claim 52 wherein one of said operating conditions being such that the principal limiting reagent producing said reaction detected by said calorimetric sensor is a reductant at one of said operating conditions while the principal limiting reagent producing said reaction detected by said calorimetric sensor at the other operating condition is an oxidant.

58. The system of claim 57 wherein said reductant being HC and said oxidant being $O_2$ and NO.

59. The system of claim 35 wherein said sensor has a catalyst surface promoting CO and/or $H_2$ exothermic oxidation reactions with exhaust gases passing over said surface; said means for cyclically operating at said first operating condition causing said engine to operate at a lean air/fuel ratio such that CO is substantially not present in said exhaust gas at said sensor; and said means for cyclically operating at said second operating condition causing said engine to operate at a rich air/fuel ratio such that the exothermic reaction of CO and/or $H_2$ with NO changes said electrical signal from said first operating condition to produce said delta signal indicative of the concentration of $NO_x$ emissions at said second operating condition.

60. The system of claim 35 wherein said sensor has a catalyst surface promoting exothermic oxidation reactions with HC, NO, CO and $H_2$ emissions contained in said exhaust gas passing over said catalyst surface; said means for cyclically operating at said first operating condition causing said engine to operate at a lean air/fuel ratio such that CO and $H_2$ is substantially not present in said exhaust gas at said sensor while said catalyst promotes exothermic oxidation reactions with HC whereby said electrical signal generated by said sensor is indicative of the HC concentrations in the exhaust gas at said first operating condition and said means for cyclically operating at said second operating condition causing said engine to operate at a rich air/fuel ratio such that CO and $H_2$ exothermic oxidation reactions with NO principally causes a heat release sensed by sensor whereby said electrical signal generated by said sensor at said second condition is indicative of the $NO_x$ concentration in said exhaust gas.

61. The system of claim 60 further including a second sensor having a second catalyst surface promoting CO and/or $H_2$ exothermic oxidation reactions with exhaust gases passing over said second surface; said second sensor signal being substantially unaffected by HC when said engine is operating in said lean first condition and producing an electrical signal indicative of $NO_x$ resulting from the exothermic oxidation reaction of CO and/or $H_2$ with NO at said second operating condition whereby said second sensor produces a second delta signal indicative of $NO_x$ concentration in said exhaust gas, and said means for generating subtracting said second delta signal from said first delta signal to produce a delta signal indicative of the concentration of HC in said exhaust gas.

62. The system of claim 35 wherein said sensor has a catalyst surface promoting exothermic oxidation reactions for HC, CO, NO and $H_2$ emissions; said vehicle has an exhaust gas recirculation means for metering a portion of said exhaust gas with combustion air injected with fuel into the combustion chambers of said vehicle; means for regulating said exhaust gas recirculation system to inject a set percentage of exhaust gas into said combustion chambers; said means for cyclically operating at said first operating condition causing said engine to operate at a lean air/fuel ratio such that CO and $H_2$ is substantially not present at said sensor while said catalyst surface area promotes exothermic oxidation reactions with said HC causing said sensor's electrical signal to be indicative of said HC concentration in said exhaust gas at said first operating condition and said means for cyclically operating at said second operating condition causing said air/fuel ratio to operate at a rich condition whereat substantially insignificant exothermic oxidation reactions occur with said gaseous emissions whereby said delta signal is indicative of the HC concentration in said exhaust gas.

63. The system of claim 62 wherein said set percentage of exhaust gas recirculated to said combustion chambers being about ten percent.

64. The system of claim 35 wherein said means for cyclically operating including means for varying the operating condition is timing of said engine, said first operating condition being selected at one timing condition and said second operating condition being selected at a second advanced timing condition.

65. In an on-board monitoring method to determine if the catalytic converter has deteriorated to the extent that a vehicle equipped with an internal combustion engine exhausts certain gaseous emissions to the atmosphere in excess of regulatory standards, said vehicle having an ECU controlling the ratio of combustion air to fuel supplied said engine in accordance with a plurality of sensor signals including those generated by an exhaust gas sensor located upstream of said catalytic converter and by a plurality of systems utilizing any given sensor signal including an EGR system to meter and mix a portion of the exhaust gases with said combustion air, said ECU cycling said ratio of combustion air to fuel supplied to said engine between a first rich mixture and a second lean mixture during certain operating conditions of said vehicle, the improvement comprising the steps of:
  a) providing a calorimetric sensor downstream of said catalytic converter for generating electrical signals corresponding to the thermal energy in the concentration of at least one regulated, specific gaseous emission within said exhaust stream;
  b) recording said calorimetric sensor signal when said engine is operating at one of said air to fuel mixtures to produce a first sensor signal and immediately recording said calorimetric signal when said engine switches to and is operating at the other one of said air to fuel mixtures to produce a second sensor signal; and,
  c) comparing the difference between said first and second recorded signals to a stored value indicative of the efficiency of said catalytic converter to determine whether said vehicle is in compliance with said regulatory standards.

66. The improvement of claim 65 wherein said catalytic converter includes a light off catalytic converter spaced closely adjacent said engine, said light off catalytic converter having a washcoat lacking ceria and operable to reduce the concentration of HC in said exhaust gas.

67. The improvement of claim 65 further including the step, before said ECU commences cycling of said air to fuel ratio, of verifying that said engine is programmed to operate at set values for one or more conditions selected from the group consisting of i) exhaust gas temperature; ii) exhaust gas volume flow; iii) engine timing; and, iv) mass air flow and/or pressure.

68. The improvement of claim 65 wherein said ECU cycles said first and second mixtures at periods of about five seconds during said monitoring only whereby driveability and/or tailpipe emissions of said vehicle during any drive cycle are not adversely affected.

69. The improvement of claim 65 wherein said sensor's electrical signal is proportional to the exothermic oxidation reactions of the gaseous emissions sensed by said sensor; said operating conditions being selected such that at one of said operating conditions at least one specific gaseous emission is caused to be present at minimal concentration levels producing exothermic oxidation reactions which cause said sensor's electrical signal generated at said one operating condition to approximate a baseline value while said specific emission is present at a higher concentration at the other one of said operating conditions to produce an exothermic oxidation reaction causing said sensor's electrical signal to exceed said baseline value and thus constitute at least a portion of said delta signal and a measure of catalyst efficiency for said specific emission.

70. The improvement of claim 69 wherein said baseline value is approximately zero and said minimal concentration of said specific emission is insignificant.

71. The improvement of claim 69 further including the steps of accumulating a plurality of said sensor's electrical signals for a plurality of cycles produced at said operating condition whereat said specific emission concentration level is at minimal concentration levels and detrending said data at said condition producing minimal concentrations whereby said baseline is established, said delta signal being the difference between said baseline and said signals produced at the other one of said operating conditions.

72. The improvement of claim 71 wherein said step of detrending includes the steps of fitting the data to a linear line and calculating the slope of said line to define said baseline.

73. The improvement of claim 69 further including the additional steps of a) performing a first plurality of cycles to generate a first plurality of normal delta signals until one or more normal delta signals indicate a failure of said catalytic converter; b) additionally varying one or more parameters selected from the group consisting of i) space velocity of said exhaust gases, ii) the temperature of said exhaust gas sensed by said sensor and iii) air/fuel ratio and/or cycling thereof by a set amount from the value said parameter had during the time said first plurality of delta signals were collected; c) performing a second plurality of operating condition cycles with said selected parameter present to generate a second plurality of stressed delta signals and d) comparing said stressed delta signals to a second threshold to determine if said normal delta signals are valid so that a failure established by said normal delta signals is attributed to a failure of the catalytic converter.

74. The improvement of claim 73 wherein said selected parameter is caused to cyclically change while said second plurality of delta signals are generated.

75. The improvement of claim 73 wherein said parameter is temperature, said method further including the step of changing the power inputted to the heater of said sensor during the time said stressed delta signals are generated so that the temperature of said exhaust gases sensed by said sensor is increased.

76. The improvement of claim 73 wherein said parameter is space velocity of said exhaust gas and said method further includes the additional step of changing one or more of said engine's operating conditions selected from the group consisting of i) mass combustion air flow; ii) manifold air pressure; and, iii) engine operating speed from the value said selected condition had during the time said first plurality of signals were generated.

77. The improvement of claim 73 wherein said parameter is said A/F ratio, said method further including the step of changing said A/F ratio and/or period during the time said stressed delta signals are obtained to values different than that present during the initial time period during which said normal delta signals were generated.

78. The improvement of claim 69 wherein one of said operating conditions is selected so that the principal limiting reagent producing said reaction detected by said calorimetric sensor is a reductant at one of said operating conditions while the principal limiting reagent producing said reaction detected by said calorimetric sensor at the other operating condition is an oxidant.

79. The improvement of claim 78 wherein said reductant is HC and said oxidant is $O_2$ and NO.

80. The improvement of claim 69 wherein said sensor has a catalyst surface promoting CO and/or $H_2$ exothermic oxidation reactions with exhaust gases passing over said surface; said first operating condition causing said engine to operate at a lean air/fuel ratio such that CO is substantially not present in said exhaust gas at said sensor; and said second operating condition causing said engine to operate at a rich air/fuel ratio such that the exothermic reaction of CO and/or $H_2$ with NO changes said electrical signal from said first operating condition to produce said delta signal indicative of the concentration of $NO_x$ emissions at said second operating condition.

81. The improvement of claim 69 wherein said sensor has a catalyst surface promoting exothermic oxidation reactions with HC, NO, CO and $H_2$ emissions contained in said exhaust gas passing over said catalyst surface; said first operating condition causing said engine to operate at a lean air/fuel ratio such that CO and $H_2$ is substantially not present in said exhaust gas at said sensor while said catalyst promotes exothermic oxidation reactions with HC whereby said electrical signal generated by said sensor is indicative of the HC concentrations in the exhaust gas at said first operating condition and said second operating condition causing said engine to operate at a rich air/fuel ratio such that CO and $H_2$ exothermic oxidation reactions with NO principally causes a heat release sensed by sensor whereby said electrical signal generated by said sensor at said second condition is indicative of the $NO_x$ concentration in said exhaust gas.

82. The improvement of claim 81 further including the steps of providing a second sensor having a second catalyst surface promoting CO and/or $H_2$ exothermic oxidation reactions with exhaust gases passing over said second surface; said second sensor signal substantially unaffected y HC when said engine is operating in said lean first condition and producing an electrical signal indicative of $NO_x$ resulting from the exothermic oxidation reaction of CO and/or $H_2$ with NO at said second operating condition whereby said second sensor produces a second delta signal indicative of $NO_x$ concentration in said exhaust gas, and subtracting said second delta signal from said first delta signal to produce a signal indicative of the concentration of HC in said exhaust gas.

83. The improvement of claim 69 wherein said sensor has a catalyst surface promoting exothermic oxidation reactions for HC, CO, NO and $H_2$ emissions; said vehicle has an exhaust gas recirculation system for metering a portion of said exhaust gas with combustion air injected with fuel into the combustion chambers of said vehicle; said method further including the steps of regulating the vehicle's exhaust gas recirculation system to inject a set percentage of exhaust gas into said combustion chambers; said first operating condition causing said engine to operate at a lean air/fuel ratio such that CO and $H_2$ is substantially not present at said sensor while said catalyst surface area promotes exothermic oxidation reactions with said HC causing said sensor's electrical signal to be indicative of said HC concentration in said exhaust gas at said first operating condition and said second operating condition causing said air/fuel ratio to operate at a rich condition whereat substantially insignificant exothermic oxidation reactions occur with said gaseous emissions whereby said delta signal is indicative of the HC concentration in said exhaust gas.

84. The improvement of claim 83 wherein said set percentage of exhaust gas recirculated to said combustion chambers is bout ten percent.

85. A system for controlling and monitoring the exhaust emissions produced by an internal combustion engine in a vehicle comprising:

a) a light off catalytic converter having a wash cost substantially devoid of ceria and containing a precious metal coating;

b) an exhaust gas sensor upstream of said catalytic converter developing electrical signals indicative of the oxygen content in exhaust gases produced by said vehicle;

c) a sensor downstream of said catalytic converter developing signals indicative of specific gaseous emissions in said exhaust gases;

d) ECU means for controlling the operation of said engine in response to said oxygen signals to cyclically produce an exhaust gas having first and second exhaust gas mixtures with different concentrations of gaseous emissions;

e) said ECU means having means i) to record said emission sensor signals developed by said emission sensor for said first and second mixtures in each signal, ii) generate a delta signal indicative of the difference in said emission signals for said first and second mixtures and iii) compare said delta signal to a stored signal indicative of the efficiency of said catalytic converter.

86. The system of claim 85 wherein said downstream sensor is a calorimetric sensor.

87. The system of claim 86 wherein said sensor's electrical signal being proportional to the exothermic oxidation reactions of the gaseous emissions sensed by said sensor; said means for cyclically operating causing said operating conditions to be selected such that at one of said operating conditions at least one specific gaseous emission is caused to be present at minimal concentration levels producing exothermic oxidation reactions which cause said sensor's electrical signal generated at said one operating condition to approximate a baseline value while said specific emission is present at a higher concentration at the other one of said operating conditions to produce an exothermic oxidation reaction causing said sensor's electrical signal to exceed said baseline value and thus constitute at least a portion of said delta signal and a measure of catalyst efficiency for said specific emission.

88. The system of claim 87 wherein said baseline value being approximately zero and said minimal concentration of said specific emission being insignificant.

89. The system of claim 87 further including means for accumulating a plurality of said sensor's electrical signals for a plurality of cycles produced at said operating condition whereat said specific emission concentration level is at minimal concentration levels and means for detrending said data at said condition producing said minimal concentrations whereby said baseline is established, said delta signal being the difference between said baseline and said signals produced at the other one of said operating conditions.

90. The system of claim 87 wherein said means for detrending includes the means for fitting the data to a linear line and calculating the slope of said line to define said baseline.

91. The system of claim 87 wherein said means for cycling producing a first plurality of cycles generating a first plurality of normal delta signals until said means for comparing indicates that one or more normal delta signals exceeded said stored value, said system further including means for; b) additionally varying one or more parameters selected from the group consisting of i) space velocity of said exhaust gases, ii) the temperature of said exhaust gas sensed by said sensor and iii) air/fuel ratio and/or cycling thereof by a set amount from the value said parameter had during the time said first plurality of delta signals were collected; means for additionally producing a second plurality of operating condition cycles with said selected parameter present to generate a second plurality of stressed delta signals; said comparing means additionally comparing said stressed delta signals to a second threshold to determine if said normal delta signals are valid, said actuating means activated when a stressed signal exceeds said second threshold.

92. The system of claim 91 wherein said selected parameter being cyclically changed while said second plurality of delta signals are generated.

93. The system of claim 91 wherein said parameter being temperature, said system further including means for changing the power inputted to the heater of said sensor during the time said stressed delta signals are generated so that the temperature of said exhaust gases sensed by said sensor is increased.

94. The system of claim 91 wherein said parameter being space velocity of said exhaust gas and said system further includes means for changing one or more of said engine's operating conditions selected from the group consisting of i) mass combustion air flow; ii) manifold air pressure; and, iii) engine operating speed from the value said selected condition had during the time said first plurality of signals were generated.

95. The system of claim 91 wherein said parameter being A/F ratio, said system further including means for changing said A/F ratio and/or period during the time said stressed delta signals are obtained to values different than that present during the initial time period during which said normal delta signals were generated.

96. The system of claim 87 wherein one of said operating conditions being such that the principal limiting reagent producing said reaction detected by said calorimetric sensor is a reductant at one of said operating conditions while the principal limiting reagent producing said reaction detected by said calorimetric sensor at the other operating condition is an oxidant.

97. The system of claim 96 wherein said reductant being HC and said oxidant being $O_2$ and NO.

98. The system of claim 87 wherein said sensor has a catalyst surface promoting CO and/or $H_2$ exothermic oxidation reactions with exhaust gases passing over said surface; said means for cyclically operating at said first operating condition causing said engine to operate at a lean air/fuel ratio such that CO is substantially not present in said exhaust gas at said sensor; and said means for cyclically operating at said second operating condition causing said engine to operate at a rich air/fuel ratio such that the exothermic reaction of CO and/or $H_2$ with NO changes said electrical signal from said first operating condition to produce said delta signal indicative of the concentration of $NO_x$ emissions at said second operating condition.

99. The system of claim 87 wherein said sensor has a catalyst surface promoting exothermic oxidation reactions with HC, NO, CO and $H_2$ emissions contained in said exhaust gas passing over said catalyst surface; said means for cyclically operating at said first operating condition causing said engine to operate at a lean air/fuel ratio such that CO and $H_2$ is substantially not present in said exhaust gas at said sensor while said catalyst promotes exothermic oxidation reactions with HC whereby said electrical signal generated by said sensor is indicative of the HC concentrations in the exhaust gas at said first operating condition and said means for cyclically operating at said second operating condition causing said engine to operate at a rich air/fuel ratio such that CO and $H_2$ exothermic oxidation reactions with NO principally causes a heat release sensed by sensor whereby said electrical signal generated by said sensor at said second condition is indicative of the $NO_x$ concentration in said exhaust gas.

100. The system of claim 99 further including a second sensor having a second catalyst surface promoting CO and/or $H_2$ exothermic oxidation reactions with exhaust gases passing over said second surface; said second sensor signal being substantially unaffected by HC when said engine is operating in said lean first condition and producing an electrical signal indicative of $NO_x$ resulting from the exothermic oxidation reaction of CO and/or $H_2$ with NO at said second operating condition whereby said second sensor produces a second delta signal indicative of $NO_x$ concentration in said exhaust gas, and said means for subtracting said second delta signal from said first delta signal to produce a delta signal indicative of the concentration of HC in said exhaust gas.

101. The system of claim 87 wherein said sensor has a catalyst surface promoting exothermic oxidation reactions for HC, CO, NO and $H_2$ emissions; said vehicle has an exhaust gas recirculation means for metering a portion of said exhaust gas with combustion air injected with fuel into the combustion chambers of said vehicle; means for regulating said exhaust gas recirculation system to inject a set percentage of exhaust gas into said combustion chambers; said means for cyclically operating at said first operating condition causing said engine to operate at a lean air/fuel ratio such that CO and $H_2$ is substantially not present at said sensor while said catalyst surface area promotes exothermic oxidation reactions with said HC causing said sensor's electrical signal to be indicative of said HC concentration in said exhaust gas at said first operating condition and said means for cyclically operating at said second operating condition causing said air/fuel ratio to operate at a rich condition whereat substantially insignificant exothermic oxidation reactions occur with said gaseous emissions whereby said delta signal is indicative of the HC concentration in said exhaust gas.

102. The system of claim 101 wherein said set percentage of exhaust gas recirculated to said combustion chambers being about ten percent.

* * * * *